(12) United States Patent
Wang et al.

(10) Patent No.: US 12,212,955 B2
(45) Date of Patent: Jan. 28, 2025

(54) METHOD AND APPARATUS FOR HANDOVER

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 17/761,359

(22) PCT Filed: Sep. 25, 2020

(86) PCT No.: PCT/KR2020/013152
§ 371 (c)(1),
(2) Date: Mar. 17, 2022

(87) PCT Pub. No.: WO2021/060941
PCT Pub. Date: Apr. 1, 2021

(65) Prior Publication Data
US 2022/0303836 A1    Sep. 22, 2022

(30) Foreign Application Priority Data
Sep. 26, 2019    (CN) .......................... 201910919593.4

(51) Int. Cl.
*H04W 4/00*    (2018.01)
*H04W 36/00*    (2009.01)
(Continued)

(52) U.S. Cl.
CPC ... *H04W 36/0033* (2013.01); *H04W 36/0064* (2023.05); *H04W 36/087* (2023.05); *H04W 40/36* (2013.01)

(58) Field of Classification Search
CPC ......... H04W 36/0055; H04W 36/0033; H04W 36/08; H04W 40/36
See application file for complete search history.

(56) References Cited

U.S. PATENT DOCUMENTS

| | | | |
|---|---|---|---|
| 2019/0053193 A1* | 2/2019 | Park ...................... | H04W 72/51 |
| 2019/0150220 A1* | 5/2019 | Byun .................... | H04W 76/11 |
| | | | 370/329 |

(Continued)

FOREIGN PATENT DOCUMENTS

| | | |
|---|---|---|
| KR | 10-2014-0102556 A | 8/2014 |
| WO | 2016/065068 A2 | 4/2016 |

OTHER PUBLICATIONS

5G; NG-RAN; 'Architecture description (3GPP TS 39.401 version 15.6.0 Release 15)', ETSI TS 138 401 V15.6.0 (Jul. 2019), Jul. 13, 2019.

(Continued)

*Primary Examiner* — Abdelnabi O Musa
(74) *Attorney, Agent, or Firm* — Jefferson IP Law, LLP

(57) ABSTRACT

The embodiments of present application provide a method and device for handover, wherein, the method includes: receiving a configuration message transmitted by a second node to support the first node for handover, wherein, the first node includes any one of a relay node, a mobile terminal part of the relay node, and a distributed unit of the relay node, and the second node includes any one of an anchor node, and a central unit of the anchor node; and configuring the first node according to the configuration message transmitted by the second node. The method provided in the present application achieves the effect of updating the configuration of the first node during the handover of the first node when moving, so that the relay node may continuously provide service for a user equipment accessing the first node.

11 Claims, 13 Drawing Sheets

(51) Int. Cl.
*H04W 36/08* (2009.01)
*H04W 40/36* (2009.01)

(56) References Cited

U.S. PATENT DOCUMENTS

| | | | |
|---|---|---|---|
| 2019/0223078 A1 | 7/2019 | Sirotkin et al. | |
| 2019/0281518 A1* | 9/2019 | Wu | H04W 36/0066 |
| 2020/0275498 A1* | 8/2020 | Fiorani | H04W 76/11 |
| 2020/0351963 A1* | 11/2020 | Shuai | H04W 84/12 |
| 2021/0058826 A1* | 2/2021 | Mao | H04W 28/088 |
| 2021/0168646 A1* | 6/2021 | Chen | H04W 28/10 |

OTHER PUBLICATIONS

Qualcomm Incorporated, 'Core network impacts of integrated access and backhaul (IAB)', C1-194418, 3GPP TSG CT WG1 Meeting #119, Wroclaw, Poland, Aug. 19, 2019.

Samsung, '(TP for NR_IAB BL CR for TS 36.423) IAB node indication for X2 handover', R3-193969, 3GPP TSG RAN WG3 Meeting #105, Ljubljana, SI, Aug. 16, 2019.

LG Electronics Inc., 'F1-U and F1-C backhauling between IAB donor and IAB node', R3-182846,3GPP TSG RAN WG3 #100, Busan, South Korea, May 11, 2018.

XP051591643, 3rd Generation Partnership Project; Technical Specification Group Radio Access Network; NR; Study on Integrated Access and Backhaul; (Release 16), Dec. 2018.

Zte et al., XP051769858, "Discussion on network-controlled IAB migration handling", R3-193654, Aug. 26-30, 2019.

Ericsson, XP051769935, "Signaling Aspects of BH RLC Channel and BAP Layer Configuration", R3-193734, Aug. 26-30, 2019

Huawei, XP051770528, "BAP layer configuration", R3-194336, Aug. 26-30, 2019

Extended European Search Report dated Sep. 8, 2022, issued in European Patent Application No. 20868841.6.

3rd Generation Partnership Project; Technical Specification Group Radio Access Network; Study on Integrated Access and Backhaul; (Release 15), 3GPP TR 38.874 1.0.0 (Dec. 2018), Dec. 4, 2018.

Chinese Office Action dated Aug. 12, 2024, issued in Chinese Application No. 201910919593.4.

European Office Action dated Jul. 5, 2024, issued in European Application No. 20868841.6.

* cited by examiner

[Fig. 1]
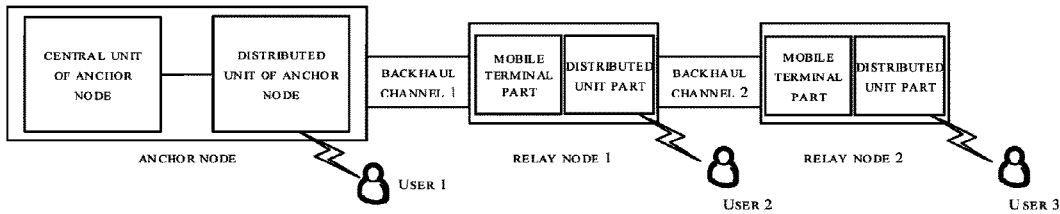
[Fig. 2A]
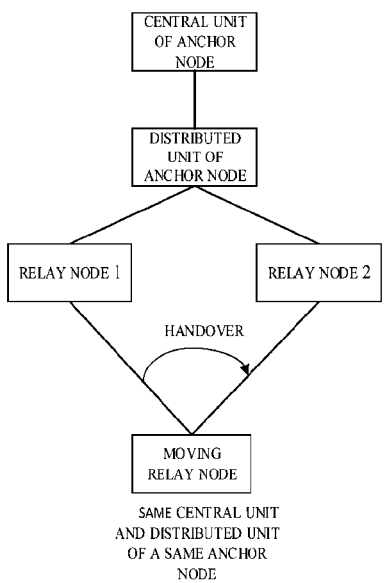
[Fig. 2B]
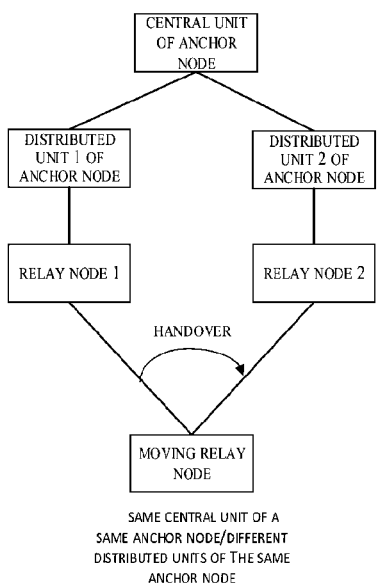

[Fig. 2C]
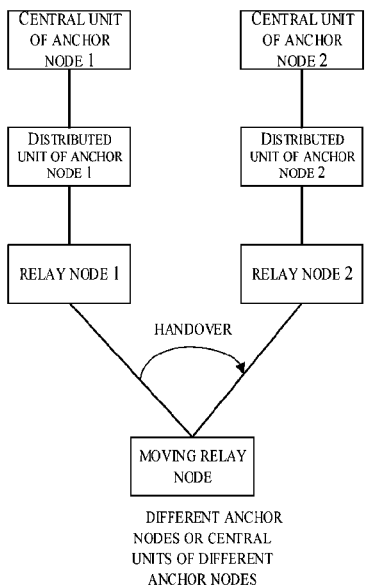
[Fig. 3]
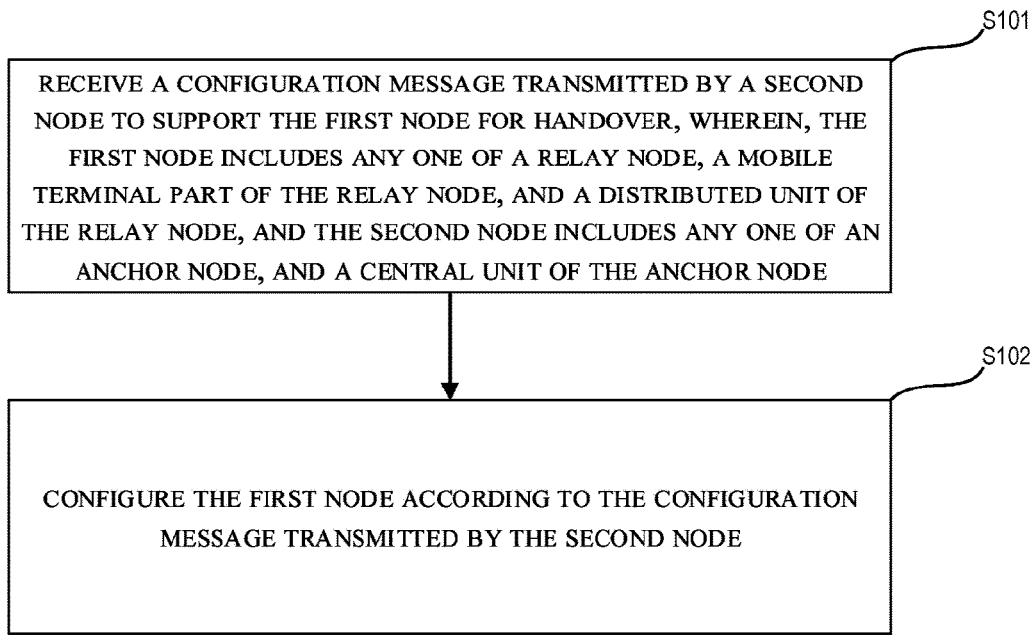

[Fig. 4]

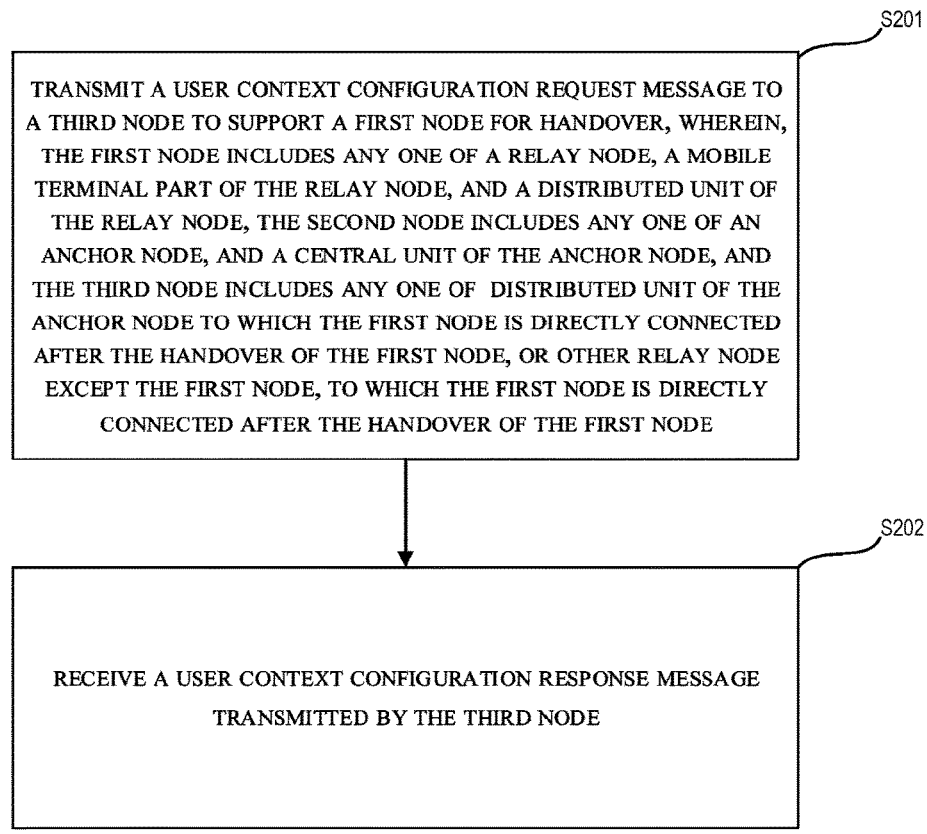

S201: TRANSMIT A USER CONTEXT CONFIGURATION REQUEST MESSAGE TO A THIRD NODE TO SUPPORT A FIRST NODE FOR HANDOVER, WHEREIN, THE FIRST NODE INCLUDES ANY ONE OF A RELAY NODE, A MOBILE TERMINAL PART OF THE RELAY NODE, AND A DISTRIBUTED UNIT OF THE RELAY NODE, THE SECOND NODE INCLUDES ANY ONE OF AN ANCHOR NODE, AND A CENTRAL UNIT OF THE ANCHOR NODE, AND THE THIRD NODE INCLUDES ANY ONE OF DISTRIBUTED UNIT OF THE ANCHOR NODE TO WHICH THE FIRST NODE IS DIRECTLY CONNECTED AFTER THE HANDOVER OF THE FIRST NODE, OR OTHER RELAY NODE EXCEPT THE FIRST NODE, TO WHICH THE FIRST NODE IS DIRECTLY CONNECTED AFTER THE HANDOVER OF THE FIRST NODE

S202: RECEIVE A USER CONTEXT CONFIGURATION RESPONSE MESSAGE TRANSMITTED BY THE THIRD NODE

[Fig. 5]

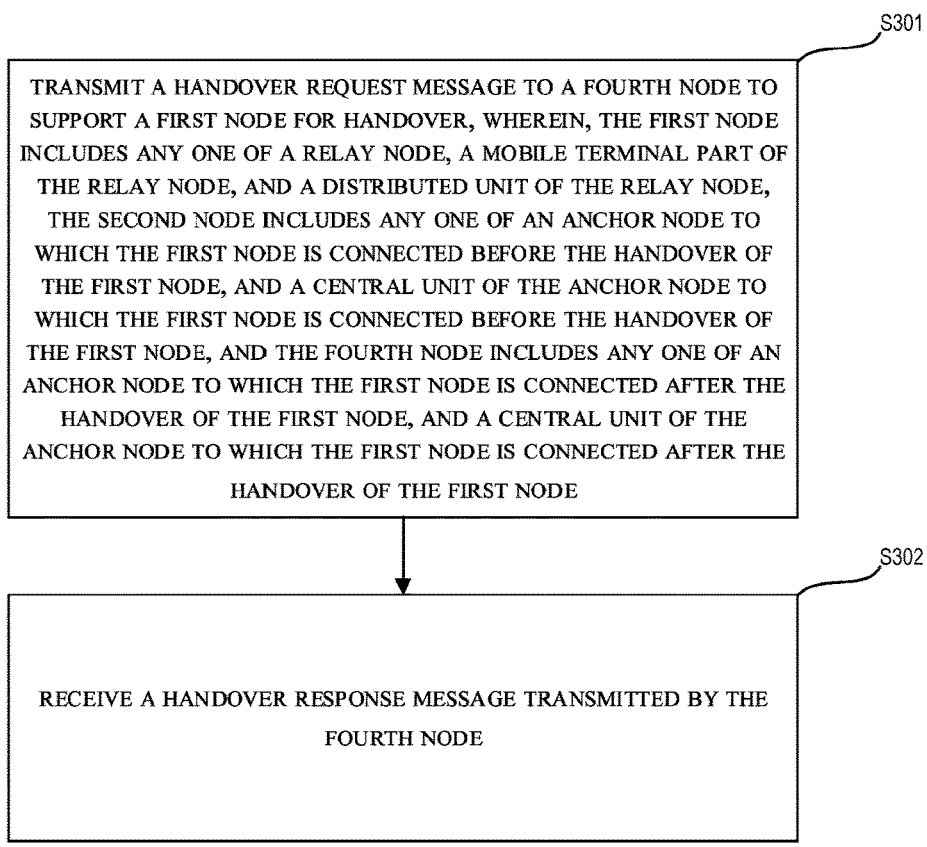

S301: TRANSMIT A HANDOVER REQUEST MESSAGE TO A FOURTH NODE TO SUPPORT A FIRST NODE FOR HANDOVER, WHEREIN, THE FIRST NODE INCLUDES ANY ONE OF A RELAY NODE, A MOBILE TERMINAL PART OF THE RELAY NODE, AND A DISTRIBUTED UNIT OF THE RELAY NODE, THE SECOND NODE INCLUDES ANY ONE OF AN ANCHOR NODE TO WHICH THE FIRST NODE IS CONNECTED BEFORE THE HANDOVER OF THE FIRST NODE, AND A CENTRAL UNIT OF THE ANCHOR NODE TO WHICH THE FIRST NODE IS CONNECTED BEFORE THE HANDOVER OF THE FIRST NODE, AND THE FOURTH NODE INCLUDES ANY ONE OF AN ANCHOR NODE TO WHICH THE FIRST NODE IS CONNECTED AFTER THE HANDOVER OF THE FIRST NODE, AND A CENTRAL UNIT OF THE ANCHOR NODE TO WHICH THE FIRST NODE IS CONNECTED AFTER THE HANDOVER OF THE FIRST NODE

S302: RECEIVE A HANDOVER RESPONSE MESSAGE TRANSMITTED BY THE FOURTH NODE

[Fig. 6]
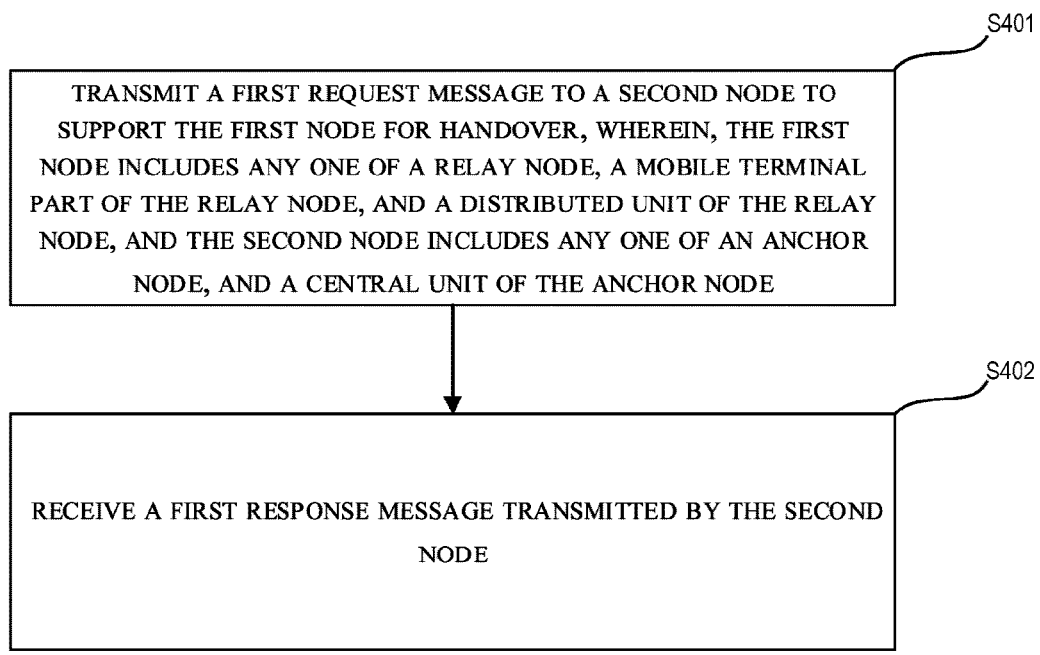

[Fig. 7]
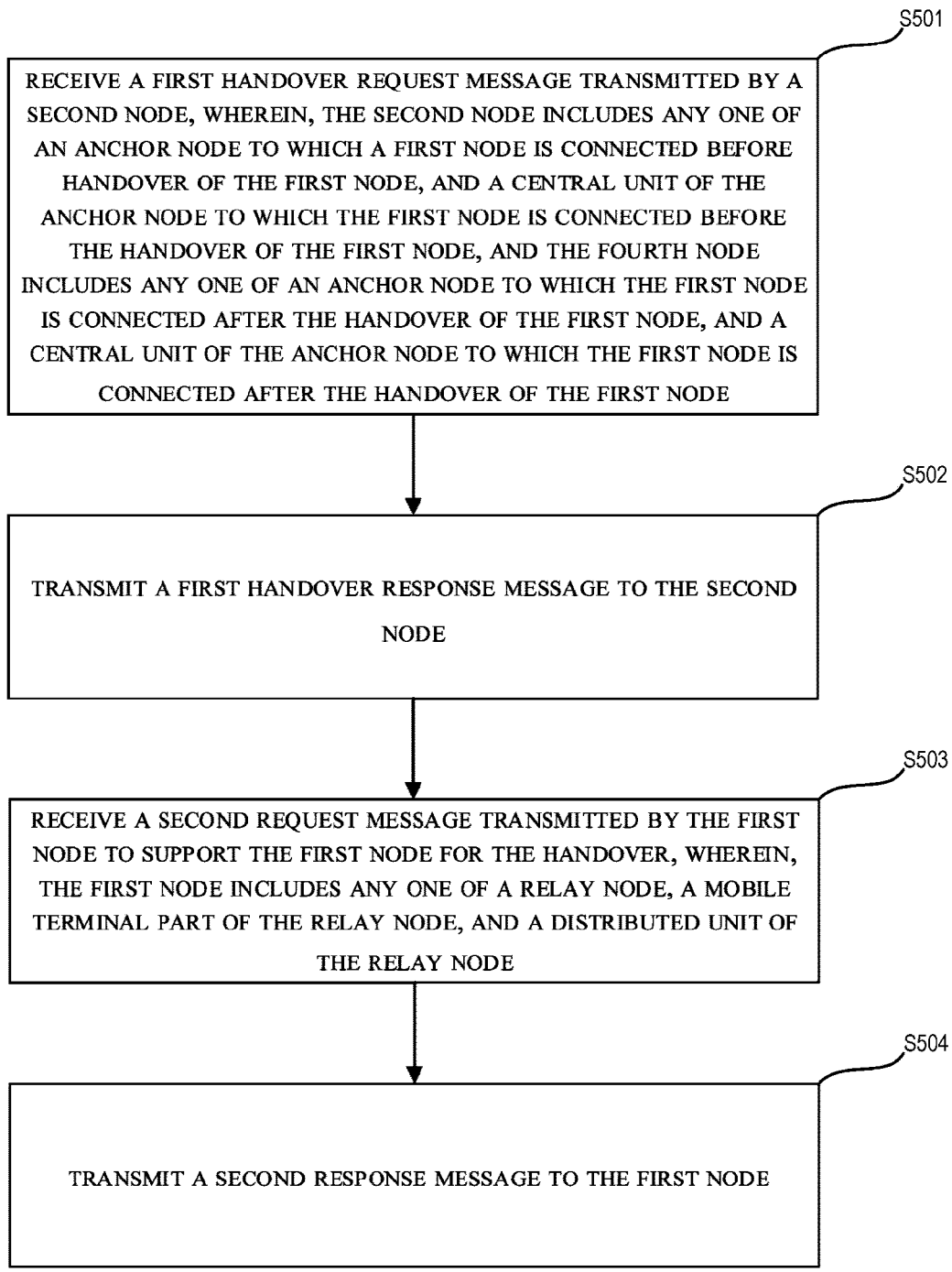

[Fig. 8A]
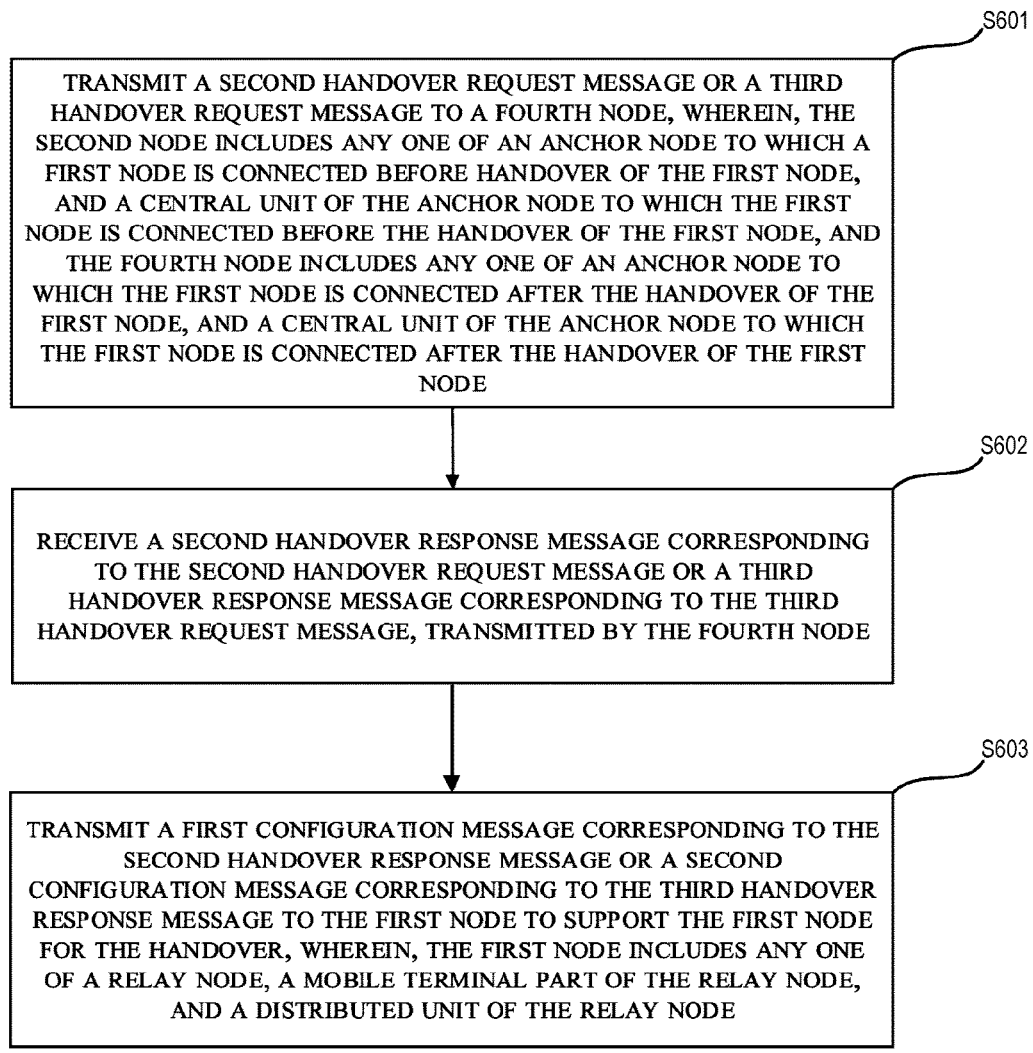

[Fig. 8B]
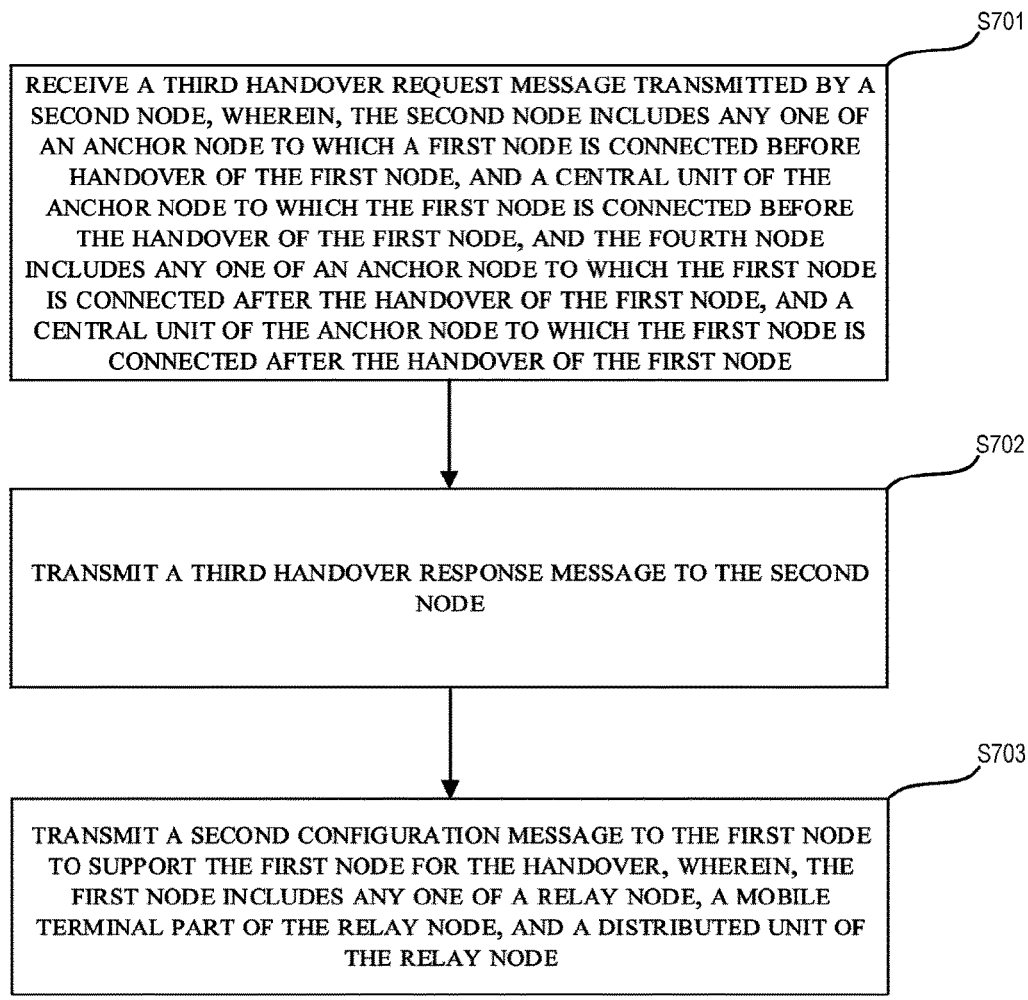
[Fig. 9A]
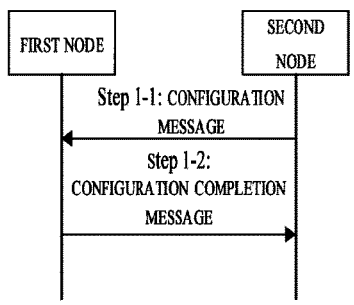
[Fig. 9B]
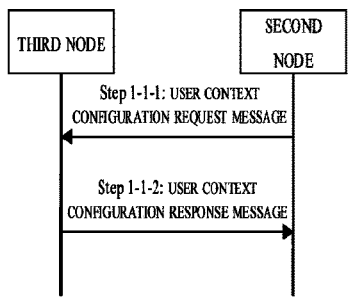

[Fig. 9C]
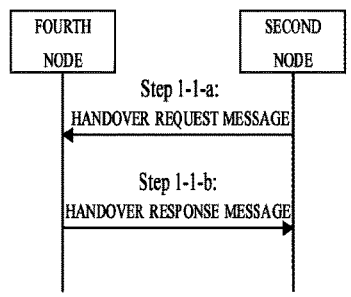
[Fig. 10A]
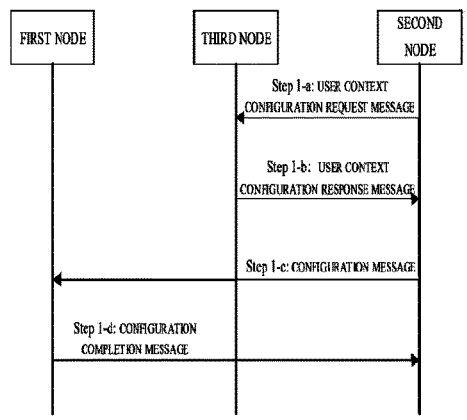
[Fig. 10B]
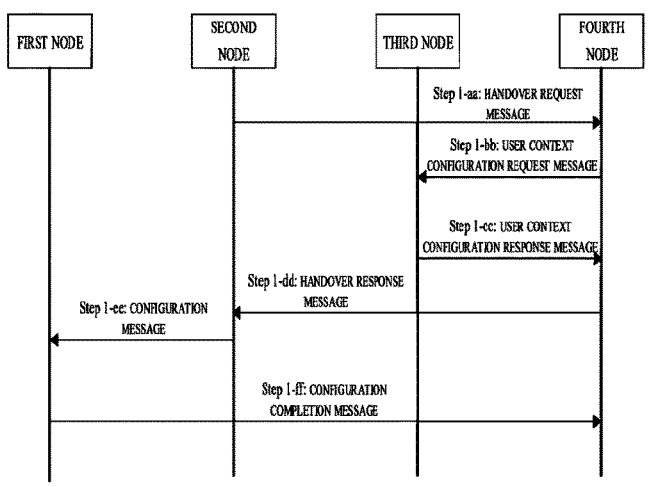
[Fig. 11]
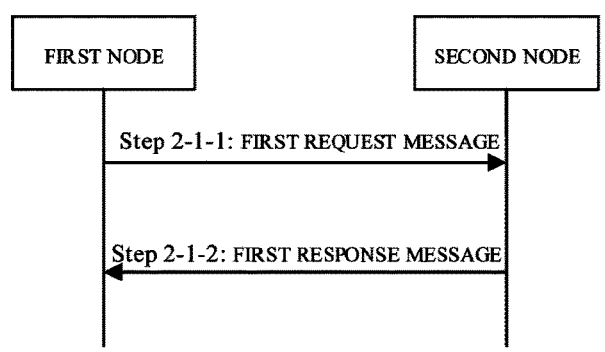

[Fig. 12A]
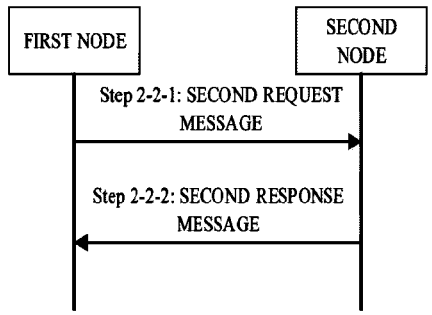
[Fig. 12B]
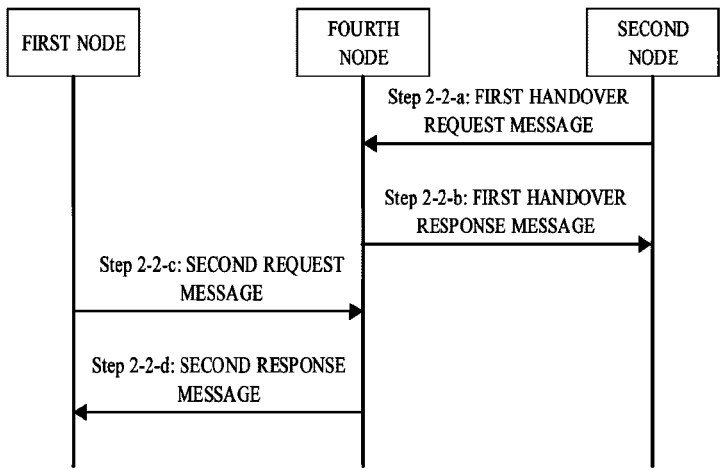
[Fig. 13]
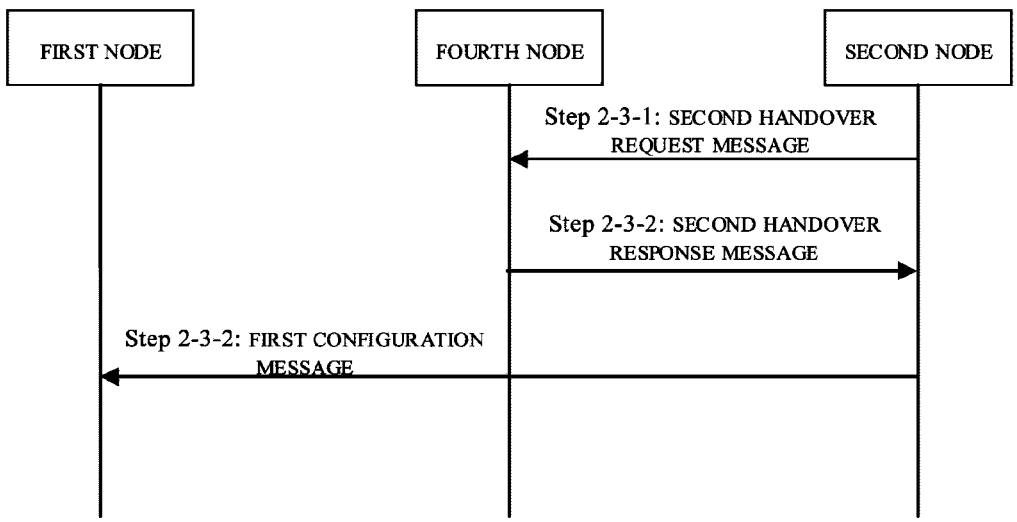

[Fig. 14]
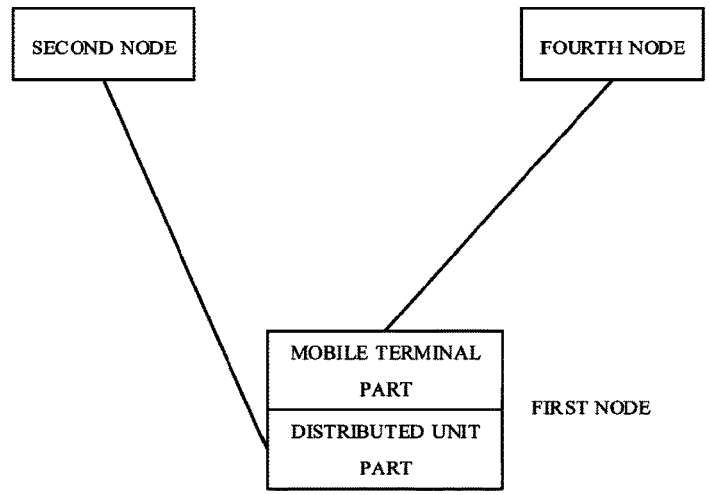
[Fig. 15A]
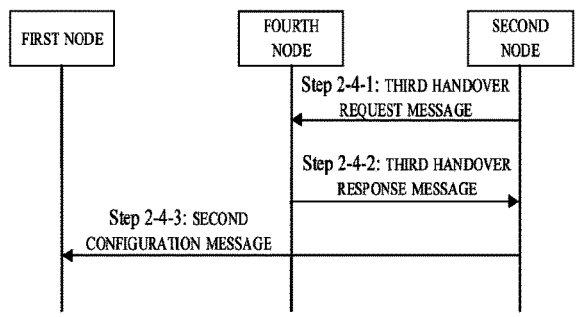
[Fig. 15B]
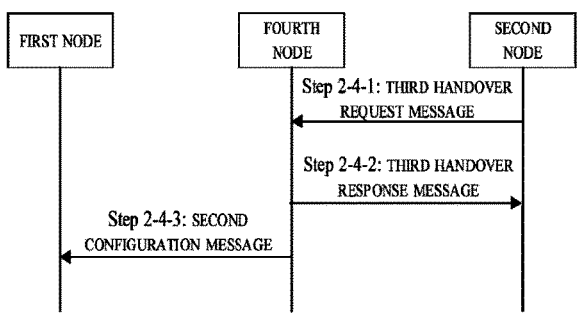
[Fig. 16]
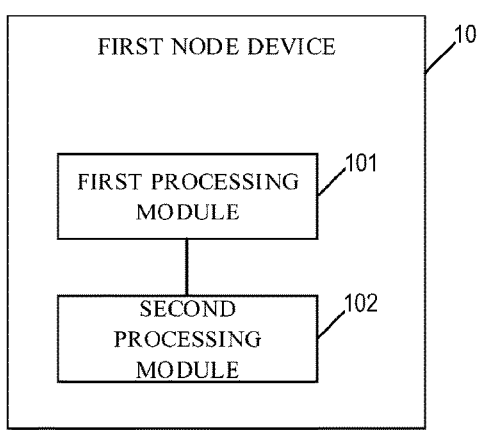

[Fig. 17]
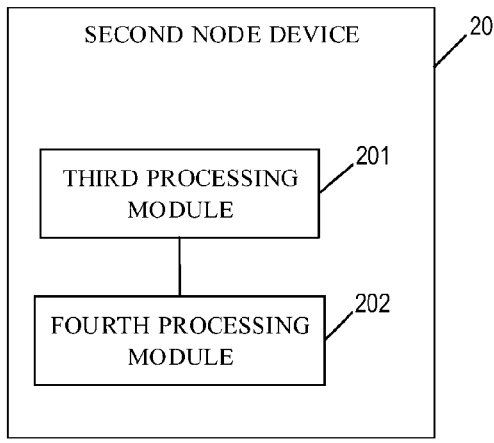
[Fig. 18]
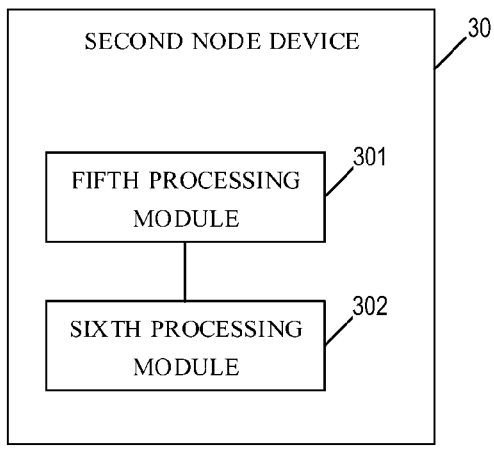
[Fig. 19]
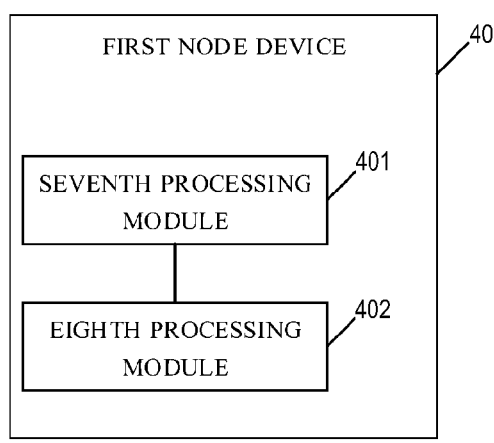

[Fig. 20]
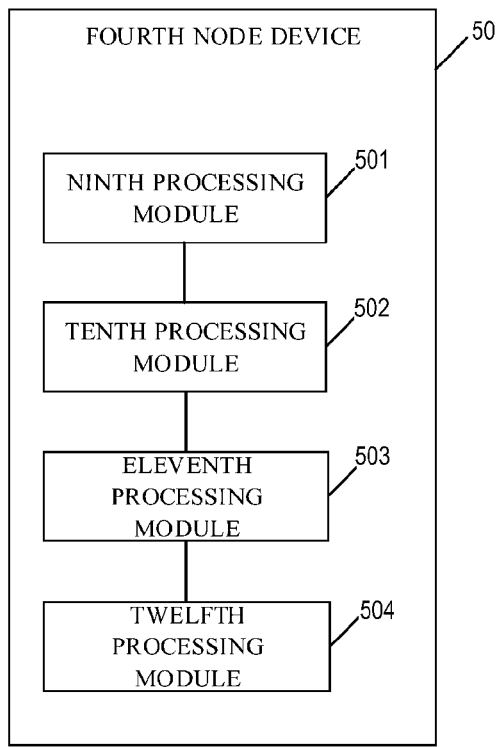
[Fig. 21]
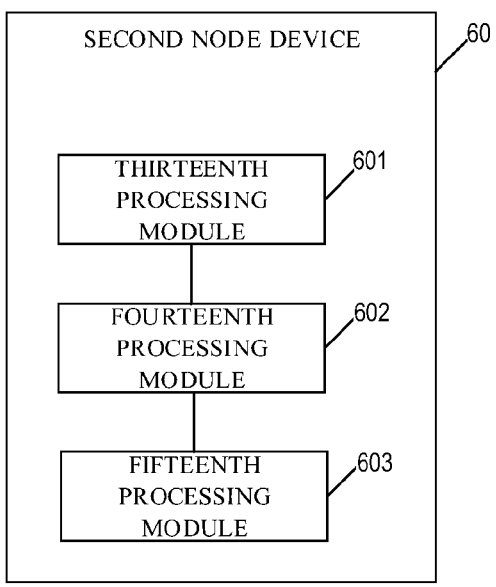

[Fig. 22]
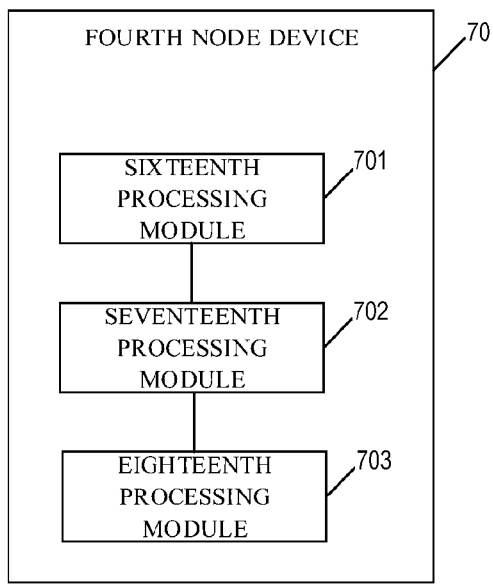
[Fig. 23]
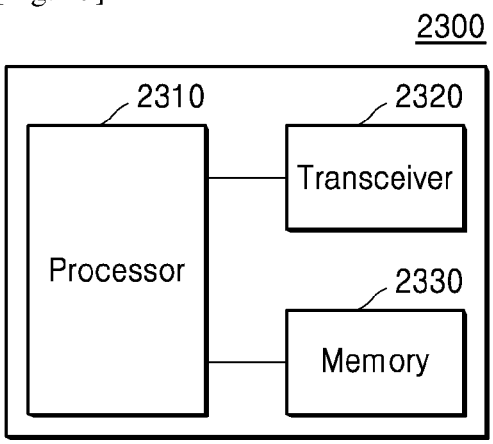

METHOD AND APPARATUS FOR HANDOVER

TECHNICAL FIELD

The present application relates to the field of wireless communication technologies, and in particular, to a method and device for handover.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

DISCLOSURE OF INVENTION

Solution to Problem

In view of the shortcomings of the existing methods, the present application proposes a method and device for handover to solve the above technical defects.

In a first aspect, a method for handover is provided, which is applied to a first node, including:

receiving a configuration message transmitted by a second node to support the first node for handover, wherein the first node includes any one of a relay node, a mobile terminal part of the relay node, and a distributed unit of the relay node, and the second node includes any one of an anchor node, and a central unit of the anchor node; and configuring the first node according to a configuration message transmitted by the second node.

Optionally, the configuration message includes at least one of the followings:

address-related information required by the first node, information related to configuration of a backhaul channel, and data routing-related information.

Optionally, the configuration message may be a Radio Resource Control (RRC) Reconfiguration message, a RRC Connection Reconfiguration message, or other message.

Optionally, the address-related information required by the first node includes at least one of the followings:

address-related information of the first node side before the handover, address-related information of the first node side after the handover, address-related information of the second node side before the handover, and address-related information of the second node side after the handover.

The address-related information of the first node side before the handover includes at least one of backhaul adaptation layer (BAP) address information of the relay node or the distributed unit of the relay node, address information of the relay node or the distributed unit of the relay node, one or more transmission layer address information used when transmitting control signaling at the relay node or the distributed unit side of the relay node, and one or more transmission layer address information used when transmitting user data at the relay node or the distributed unit side of the relay node.

The address-related information of the first node side after the handover includes at least one of BAP address information of the relay node or the distributed unit of the relay node, address information of the relay node or the distributed unit of the relay node, one or more transmission layer address information used when transmitting control signaling at the relay node or the distributed unit side of the relay node, and one or more transmission layer address information used when transmitting user data at the relay node or the distributed unit side of the relay node.

The address-related information of the second node side before the handover includes at least one of address information of the anchor node or the central unit of the anchor node, one or more transmission layer address information used when transmitting control signaling at the anchor node or the distributed unit side of anchor node, and one or more transmission layer address information used when transmitting user data at the anchor node or the central unit side of the anchor node.

The address-related information of the second node side after the handover includes at least one of address information of the anchor node or the central unit of the anchor node, one or more transmission layer address information used when transmitting control signaling at the anchor node or the central unit side of the anchor node, and one or more transmission layer address information used when transmitting user data at the anchor node or the central unit side of the anchor node.

Optionally, the information related to the configuration of the backhaul channel includes at least one of the followings:

identification information of the backhaul channel, quality of service (QoS) parameter information of the backhaul channel, configuration information for serving the backhaul channel, information on mapping relationship between the backhaul channel and other backhaul channels before and after the handover of the relay node, and information related to data carried by the backhaul channel.

The information on the mapping relationship between the backhaul channel and other backhaul channels before and after the handover of the relay node includes at least one of information on the backhaul channel served by a mobile terminal part of the relay node before the handover of the relay node, information on the backhaul channel served by the mobile terminal part of the relay node after the handover of the relay node, information on the backhaul channel served by the mobile terminal part of the relay node, information on the backhaul channel served by the distributed unit of the relay node before the handover of the relay node, information on the backhaul channel served by the distributed unit of the relay node after the handover of the relay node, and information on the backhaul channel served by the distributed unit of the relay node.

The information related to the data carried by the backhaul channel includes at least one of information related to user data radio bearer (DRB) to which the data belongs, identification information of QoS of the data, indication information of the type of control signaling to which the data belongs, indication information indicating that the type of the data is non-F1 traffic, information on a destination receiving node of the data, information on a source transmitting node of the data, tunnel endpoint identifier (TEID) (such as GTP-TEID) information of the data, indication information of content of information contained in the data, and path identification information of the data.

Optionally, the data routing-related information includes at least one of the followings:

BAP address information contained in a data packet, path identification information contained in a data packet, BAP routing identification information of a data packet, identification information of a node receiving a data packet transmitted by the relay node, identification information of a cell group used when the relay node transmits a data packet, and indication information of a cell group used when the relay node transmits a data packet.

In a second aspect, a method for handover is provided, which is applied to a second node, including:

transmitting a user context configuration request message to a third node to support a first node for handover, wherein, the first node includes any one of a relay node, a mobile terminal part of the relay node, and a distributed unit of the relay node, the second node includes any one of an anchor node, and a central unit of the anchor node, and the third node includes any one of distributed unit of the anchor node to which the first node is directly connected after the handover, or other relay node except the first node, to which the first node is directly connected after the handover; and receiving a user context configuration response message transmitted by the third node.

Optionally, the user context configuration request message includes at least one of the followings:

one or more piece of information contained in an existing UE context setup request or UE context modification request message, information related to the backhaul channel served by the distributed unit part of the third node, and data routing-related information.

The information related to the backhaul channel served by the distributed unit part of the third node includes at least one of identification information of the backhaul channel, QoS parameter information of the backhaul channel, and information related to the data carried by the backhaul channel.

Optionally, the user context configuration response message includes at least one of the followings:

one or more piece of information contained in the existing UE context setup response or UE context modification response message, information on a backhaul channel accepted by the third node or the distributed unit of the third node, information on a backhaul channel not being accepted by the third node or the distributed unit of the third node, and configuration information on a backhaul channel generated by the third node or the distributed unit of the third node.

In a third aspect, a method for handover is provided, which is applied to the second node, including:

transmitting a handover request message to a fourth node to support a first node for handover, wherein, the first node includes any one of a relay node, a mobile terminal part of the relay node, and a distributed unit of the relay node, the second node includes any one of an anchor node to which the first node is connected before the handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

receiving a handover response message transmitted by the fourth node.

Optionally, the handover request message includes at least one of the followings:

one or more piece of information contained in an existing handover request message, address-related information of the first node, information related to a backhaul channel served by the mobile terminal part of the first node, data routing-related information, configuration information of a distributed unit part of the first node, and information related to configuration of a user equipment served by the distributed unit part of the first node.

The address-related information of the first node includes at least one of address-related information of the first node side before the handover, and address-related information of the second node side before the handover.

The configuration information of the distributed unit part of the first node includes at least one of identification information, identification information of an anchor node or a central unit of the anchor node being accessed, configuration information of a served cell, supported radio resource control (RRC) version information, and RRC version information of the anchor node or the central unit of the anchor node.

The configuration information of the served cell includes at least one of identification information of the cell, one or more piece of information contained in existing served cell information, system message information, and cell service status information.

The information related to the configuration of the user equipment served by the distributed unit part of the first node includes at least one of identification information of a user DRB, information related to QoS of a user DRB, identification information of a user signaling radio bearer (SRB), configuration information of the user equipment, and configuration information of general packet radio service (GPRS) tunneling protocol user plane (GTP-U) tunnel for receiving user DRB data at the central unit side of the second node.

Optionally, the handover response message includes at least one of the followings:

one or more piece of information contained in an existing handover request acknowledge message, address-related information of the first node, information related to the mobile terminal part of the first node, data routing-related information, configuration information of a distributed unit part of the first node, information on a cell to be activated, information on a cell to be deactivated, reason information for deactivating a cell, and information related to configuration of a user equipment served by the distributed unit part of the first node.

The address-related information of the first node includes at least one of address-related information of the first node side before the handover, address-related information of the second node side before the handover, address-related information of the first node side after the handover, and address-related information of the fourth node side after the handover.

The information related to the mobile terminal part of the first node includes at least one of identification information of the backhaul channel being accepted, identification information of the backhaul channel not being accepted, and configuration information related to the served backhaul channel.

The information related to the configuration of the user equipment served by the distributed unit part of the first node includes at least one of identification information of the user DRB being accepted, identification information of the user DRB not being accepted, identification information of the user SRB being accepted, identification information of the user SRB not being accepted, configuration information of the user equipment, configuration information of GTP-U tunnel for receiving user DRB data at the distributed unit side of the first node, configuration information of GTP-U tunnel for receiving user DRB data at the distributed unit side of the first node before the handover, configuration information of GTP-U tunnel for receiving user DRB data at the central unit side of the fourth node, and configuration information of GTP-U tunnel for receiving user DRB data at the central unit side of the second node before the handover.

In a fourth aspect, a method for handover is provided, which is applied to a first node, including:

transmitting a first request message to a second node to support the first node for handover, wherein, the first node includes any one of a relay node, a mobile terminal part of the relay node, and a distributed unit of the relay node, and the second node includes any one of an anchor node, and a central unit of the anchor node; and receiving a first response message transmitted by the second node.

Optionally, the first request message includes at least one of the followings:

address-related information of the first node, information related to configuration of the distributed unit of the first node, and assistant information for obtaining configuration information of the distributed unit of the first node.

The address-related information of the first node includes at least one of address-related information of the first node side before the handover, and address-related information of the second node side before the handover.

The information related to the configuration of the distributed unit of the first node includes at least one of information related to the configuration of the distributed unit of the first node before the handover, and information related to the configuration of the distributed unit of the first node after the handover.

The assistant information for obtaining the configuration information of the distributed unit of the first node includes at least one of information related to the mobile terminal part of the first node after the handover, information related to the mobile terminal part of the first node before the handover, and information related to the distributed unit of the first node before the handover.

Optionally, the first response message includes at least one of the followings:

information related to configuration of the distributed unit of the first node after update, information related to configuration of the distributed unit of the first node before update, information on a cell to be activated, information on a cell to be deactivated, reason information for deactivating a cell, and address-related information of the first node.

The address-related information of the first node includes at least one of address-related information of the first node side before the handover, address-related information of the second node side before the handover, address-related information of the first node side after the handover, and address-related information of the second node side after the handover.

In a fifth aspect, a method for handover is provided, which is applied to a fourth node, including:

receiving a first handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

transmitting a first handover response message to the second node;

receiving a second request message transmitted by the first node to support the first node for the handover, wherein, the first node includes any one of a relay node, a mobile terminal part of the relay node, and a distributed unit of the relay node; and transmitting a second response message to the first node.

Optionally, the second request message includes at least one of the followings:

information related to configuration of the distributed unit of the first node before the handover, address-related information of the first node, and assistant information for obtaining configuration information of the distributed unit of the first node.

The address-related information of the first node includes any one of address-related information of the first node side before the handover, and address-related information of the second node side before the handover.

The assistant information for obtaining the configuration information of the distributed unit of the first node includes any one of the information related to the mobile terminal part of the first node after the handover, information related to the mobile terminal part of the first node before the handover, and information related to the distributed unit of the first node before the handover.

Optionally, the second response message includes at least one of the followings:

information related to configuration of the distributed unit of the first node, information on a cell to be activated, information on a cell to be deactivated, reason information for deactivating the cell, and address-related information of the first node.

The information related to the configuration of the distributed unit of the first node includes any one of information related to the configuration of the distributed unit of the first node before the handover, and the information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

In a sixth aspect, a method for handover is provided, which is applied to a second node, including:

transmitting a second handover request message or a third handover request message to a fourth node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

receiving a second handover response message corresponding to the second handover request message or a third handover response message corresponding to the third handover request message, transmitted by the fourth node; and transmitting a first configuration message corresponding to the second handover response message or a second configuration message corresponding to the third handover response message to the first node to support the first node for the handover, wherein, the first node includes any one of a relay node, a mobile terminal part of the relay node, and a distributed unit of the relay node.

Optionally, the first configuration message or the second configuration message includes at least one of the followings:

information related to configuration of a distributed unit of the first node, information on a cell to be activated, information on a cell to be deactivated, reason information for deactivating a cell, and address-related information of the first node.

The information related to the configuration of the distributed unit of the first node includes any one of information related to the configuration of the distributed unit of the first node before the handover, and information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

Optionally, the second handover request message or the third handover request message includes at least one of the followings:

information related to the configuration of the distributed unit of the first node before the handover, and address-related information of the first node.

The address-related information of the first node includes any one of address-related information of the first node side before the handover, and address-related information of the second node side before the handover.

Optionally, the second handover response message or the third handover response message includes at least one of the followings:

address-related information of the first node, information of the cell to be activated, information of the cell to be deactivated, and reason information for deactivating the cell, The address-related information of the first node includes any one of address-related information of the first node side before the handover, and address-related information of the first node side after the handover.

Optionally, the address-related information of the first node includes any one of address-related information of the first node side before the handover, address-related information of the second node side before the handover, address-related information of the first node side after the handover, and address-related information of the second node side after the handover.

In a seventh aspect, a first node device is provided, including:

a first processing module, configured to receive a configuration message transmitted by a second node to support a first node for handover, wherein, the first node includes any one of a relay node, a mobile terminal part of the relay node, and a distributed unit of the relay node, and the second node includes any one of an anchor node, and a central unit of the anchor node; and a second processing module, configured to configure the first node according to the configuration message transmitted by the second node.

In an eighth aspect, a second node device is provided, including:

a third processing module, configured to transmit a user context configuration request message to a third node to support a first node for handover, wherein, the first node includes any one of a relay node, a mobile terminal part of the relay node, and a distributed unit of the relay node, the second node includes any one of an anchor node, and a central unit of the anchor node, and the third node includes any one of distributed unit of the anchor node to which the first node is directly connected after the handover, or other relay node except the first node, to which the first node is directly connected after the handover; and a fourth processing module, configured to receive a user context configuration response message transmitted by the third node.

In a ninth aspect, a second node device is provided, including:

a fifth processing module, configured to transmit a handover request message to a fourth node to support a first node for handover, wherein, the first node includes any one of a relay node, a mobile terminal part of the relay node, and a distributed unit of the relay node, the second node includes any one of an anchor node to which the first node is connected before the handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node; and a sixth processing module, configured to receive a handover response message transmitted by the fourth node.

In a tenth aspect, a first node device is provided, including:
- a seventh processing module, configured to transmit a first request message to a second node to support a first node for handover, wherein, the first node includes any one of a relay node, a mobile terminal part of the relay node, and a distributed unit of the relay node, and the second node includes any one of an anchor node, and a central unit of the anchor node; and
- an eighth processing module, configured to receive a first response message transmitted by the second node.

In an eleventh aspect, a fourth node device is provided, including:
- a ninth processing module, configured to receive a first handover request message transmitted by a second node, wherein, the second node includes any one of an anchor node to which a first node is connected before the handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;
- a tenth processing module, configured to transmit a first handover response message to the second node;
- an eleventh processing module, configured to receive a second request message transmitted by the first node to support the first node for the handover, wherein, the first node includes any one of a relay node, a mobile terminal part of the relay node, and a distributed unit of the relay node; and
- a twelfth processing module, configured to transmit a second response message to the first node.

In a twelfth aspect, a second node device is provided, including:
- a thirteenth processing module, configured to transmit a second handover request message or a third handover request message to a fourth node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;
- a fourteenth processing module, configured to receive a second handover response message corresponding to the second handover request message or a third handover response message corresponding to the third handover request message, transmitted by the fourth node; and
- a fifteenth processing module, configured to transmit a first configuration message corresponding to the second handover response message or a second configuration message corresponding to the third handover response message to the first node to support the first node for the handover, wherein, the first node includes any one of a relay node, a mobile terminal part of the relay node, and a distributed unit of the relay node.

In a thirteenth aspect, a method for handover is provided, which is applied to a fourth node, including:
- receiving a third handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;
- transmitting a third handover response message to the second node; and
- transmitting a second configuration message to the first node to support the first node for the handover, wherein, the first node includes any one of a relay node, a mobile terminal part of the relay node, and a distributed unit of the relay node.

In a fourteenth aspect, a fourth node device is provided, including:
- a sixteenth processing module, configured to receive a third handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;
- a seventeenth processing module, configured to transmit a third handover response message to the second node; and
- an eighteenth processing module, configured to transmit a second configuration message to the first node to support the first node for the handover, wherein, the first node includes any one of a relay node, a mobile terminal part of the relay node, and a distributed unit of the relay node.

The embodiments of the present application have at least the following beneficial effects:

The configuration message transmitted by the second node to support the first node for the handover is received. The first node includes any one of the relay node, the mobile terminal part of the relay node, and the distributed unit of the relay node. The second node includes any one of the anchor node, and the central unit of the anchor node. The first node is configured according to the configuration message transmitted by the second node. In this way, it achieves that the configuration of the first node is updated during the handover of the first node when moving, such as the configuration of the distributed unit part of the first node, the configuration of the mobile terminal part of the first node, and the like, so that the relay node may continuously provide service for a user equipment accessing the first node.

Additional aspects and advantages of the present application will be partially appreciated and become apparent from the description below, or will be learned from the practices of the present application.

BRIEF DESCRIPTION OF DRAWINGS

In order to explain the technical solutions in the embodiments of the present application more clearly, the drawings used in the description of the embodiments of the present application will be briefly introduced below.

FIG. 1 is a schematic diagram of an existing multi-hop relay network architecture;

FIG. 2A-2C is a schematic diagram of moving of a relay node according to an embodiment of the present application;

FIG. 3 is a schematic flowchart of a method for handover according to an embodiment of the present application;

FIG. 4 is a schematic flowchart of another method for handover according to an embodiment of the present application;

FIG. 5 is a schematic flowchart of another method for handover according to an embodiment of the present application;

FIG. 6 is a schematic flowchart of another method for handover according to an embodiment of the present application;

FIG. 7 is a schematic flowchart of another method for handover according to an embodiment of the present application;

FIG. 8A is a schematic flowchart of another method for handover according to an embodiment of the present application;

FIG. 8B is a schematic flowchart of another method for handover according to an embodiment of the present application;

FIG. 9A-9C is a schematic diagram of a signaling interaction process between nodes;

FIG. 10A-10B is a schematic diagram of a handover process between relay nodes;

FIG. 11 is a schematic diagram of Method 1 for configuring a distributed unit part of a relay node;

FIG. 12A-12B is a schematic diagram of Method 2 for configuring a distributed unit part of a relay node;

FIG. 13 is a schematic diagram of Method 3 of configuring a distributed unit part of a relay node;

FIG. 14 is a schematic diagram of a communication manner between a distributed unit part of a relay node and an anchor node;

FIG. 15A-15B is a schematic diagram of Method 4 of configuring a distributed unit part of a relay node;

FIG. 16 is a schematic structural diagram of a first node device according to an embodiment of the present application;

FIG. 17 is a schematic structural diagram of a second node device according to an embodiment of the present application;

FIG. 18 is a schematic structural diagram of a second node device according to an embodiment of the present application;

FIG. 19 is a schematic structural diagram of a first node device according to an embodiment of the present application;

FIG. 20 is a schematic structural diagram of a fourth node device according to an embodiment of the present application;

FIG. 21 is a schematic structural diagram of a second node device according to an embodiment of the present application; and FIG. 22 is a schematic structural diagram of a fourth node device according to an embodiment of the present application.

FIG. 23 illustrates a node according to embodiments of the present disclosure.

BEST MODE FOR CARRYING OUT THE INVENTION

According to an embodiment of the disclosure, there is provided a method for first node handover performed by a second node, the method comprising: transmitting an user context configuration request message to a third node, receiving an user configuration response message from the third node, receiving, via the third node, a configuration completion message from the first node, and establishing a backhaul channel between the second node and the first node or between the third node and the first node.

In the embodiment, the user context configuration request message comprises data routing related information.

In the embodiment, the data routing related information comprises Backhaul Adaptation Protocol (BAP) address information for the first node.

In the embodiment, the configuration message comprises at least one of: address related information for the first node, configuration information related to the backhaul channel for the first node, and data routing related information for the first node.

In the embodiment, the address related information for the first node comprises at least one of: one or more transport address information used when transmitting control signaling at the first node, and one or more transport layer address information used when transmitting user data at the first node.

In the embodiment, the configuration information related to the backhaul channel for the first node comprises at least one of: an identification information of the backhaul channel, and an indication information on that traffic type carried by the backhaul channel, wherein the indication information on that traffic type comprises F1-C traffic and non-F1 traffic.

In the embodiment, the data routing related information for the first node comprising Backhaul Adaptation Protocol (BAP) routing identification information including BAP address information of destination receiving node and path identification information.

In the embodiment, the configuration information related to the backhaul channel for the first node, and the data routing related information for the first node are used for the uplink data transmitted by the first node to the second node.

In the embodiment, the first node is relay node comprising a distributed unit (DU) and a mobile terminal (MT), the second node is IAB donor node comprising a central unit (CU) and a distributed unit (DU), the third node is target parent node comprising a distributed unit (DU).

According to an embodiment of the disclosure, there is provided an apparatus for a first node handover, the apparatus comprising: a memory, a transceiver, a processor coupled with the memory and the transceiver, configured to: transmit an user context configuration request message to a third node, receive an user configuration response message from the third node, receive, via the third node, a configuration completion message from the first node, and establish a backhaul channel between the apparatus and the first node or between the third node and the first node.

In the embodiment, the user context configuration request message comprises data routing related information.

In the embodiment, the data routing related information comprises Backhaul Adaptation Protocol (BAP) address information for the first node.

In the embodiment, the configuration message comprises at least one of: address related information for the first node, configuration information related to the backhaul channel for the first node, and data routing related information for the first node.

In the embodiment, the configuration information related to the backhaul channel for the first node, and the data routing related information for the first node are used for the uplink data transmitted by the first node to the apparatus.

In the embodiment, the first node is relay node comprising a distributed unit (DU) and a mobile terminal (MT), the apparatus is IAB donor node comprising a central unit (CU) and a distributed unit (DU), the third node is target parent node comprising a distributed unit (DU).

MODE FOR THE INVENTION

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that term "include" used in the specification of the present application specifies the presence of the stated features, integers, steps, operations, elements and/or components, but not exclusive of the presence or addition of one or more other features, integers, steps, operations, elements, components, and/or combinations thereof. It should be understood that when an element is referred to as being "connected" or "coupled" to another element, it may be directly connected or coupled to other elements or provided with intervening elements therebetween. In addition, "connected" or "coupled" as used herein may include wireless connection or coupling. As used herein, term "and/or" includes all or any of one or more associated listed items or combinations thereof.

In order to make the objects, technical solutions and advantages of the present application clearer, the embodiments of the present application will be further described in detail below with reference to the accompanying drawings.

In the study of NR (New Radio access) network version Release 16, in order to extend coverage of the network, an IAB (Integrated Access and Backhaul) project, of which the main purpose is to build a multi-hop network architecture, is proposed. FIG. 1 shows a schematic architecture of a multi-hop network, and a network architecture including an anchor node (IAB donor) and two relay nodes (IAB nodes) is shown in the figure. A user equipment in this multi-hop network may access the network through the anchor node or a distributed unit of the anchor node or the relay node. For example, users 1/2/3 access the relay network through the distributed unit of the anchor node, a distributed unit part of a relay node 1 and a distributed unit part of a relay node 2, respectively. The anchor node may be an independent base station, or a base station composed of a central unit CU (IAB-donor central unit) and a distributed unit DU (IAB-donor distributed unit). The relay node includes a mobile terminal part, which is used to communicate with an upper-level (parent) node relative to the relay node (for example, the mobile terminal part of the relay node 1 is used to communicate with the anchor node or the distributed unit of the anchor node, the mobile terminal part of the relay node 2 is used to communicate with the distributed unit part of the relay node 1), and a distributed unit part, which is used to communicate with a lower-level (child) node relative to the relay node (for example, the distributed unit part of the relay node 1 is used to communicate with the user 2, and may also be used to communicate with the mobile terminal part of the relay node 2). The mobile terminal part of the relay node may be regarded as a user accessing the network, so it has a function of common user (non-relay node) (for example, the mobile terminal part may establish a Signaling Radio Bearer (SRB) with its upper-level (parent) node to transmit a Radio Resource Control (RRC) message, or a Data Radio Bearer (DRB) to transmit data). The central unit of the anchor node includes the following protocol stacks: a protocol stack of a service control plane including a Radio Resource Control (RRC) protocol layer and a Packet Data Convergence Protocol (PDCP) layer; and a protocol stack of a service user plane including a Service Data Adaptation Protocol (SDAP) layer and a PDCP layer. The distributed unit of the anchor node or the distributed unit part of the relay node includes the following protocol stacks: the protocol stacks of the service control plane and the user plane including a Radio Link Control (RLC) protocol layer, a Medium Access Control (MAC) protocol layer, and a Physical Layer (PHY). The interfaces between the central unit of the anchor node and the distributed unit of the anchor node, and between the central unit of the anchor node and the distributed unit of the relay node are F1 traffic (see 3GPP TS38.473).

In a relay network, the link between the relay node and the anchor node or the distributed unit of the anchor node, or between the relay nodes is a backhaul link, on which one or more backhaul channels will be established, such as backhaul channel 1 and backhaul channel 2 in FIG. 1. An example of the backhaul channel is a backhaul link Radio Link Control (RLC) channel, i.e. backhaul RLC channel. In the relay network, each backhaul channel is used to transmit data packet that belongs to the same user or different users. The data packet may be a data packet of a user Data Radio Bearer (DRB), a data packet of a user Signaling Radio Bearer (SRB), a data packet of a control plane on F1 traffic, a data packet of a user plane on the F1 traffic, or a data packet of a non-F1 traffic (such as a data packet of IPSec (IP Security, Internet Protocol Security), a data packet of SCTP (Stream Control Transmission Protocol) protocol, or a data packet of an OAM (Operation Maintenance and Maintenance), and the like).

In order to realize the transmission of user data in a multi-hop relay network, a new protocol layer is defined in 3GPP, namely a Backhaul Adaptation layer (BAP). The protocol layer will be configured in the relay node (such as the mobile terminal part of the relay node and/or the distributed unit part of the relay node) and the distributed unit of the anchor node, and located above the RLC layer. The main function of the protocol layer is to route and map data packets. Routing of the data packet refers to transmitting the received data packet to a correct next hop node so as to be received by a destination receiving node of the data packet (the destination receiving node may be a relay node, an anchor node, a distributed unit of the anchor node or a central unit of the anchor node. If the destination receiving node is a relay node, it means that the data packet is a data packet of the relay node, such as a data packet of the control signaling of the F1 traffic that the distributed unit of the relay node needs to receive, or a data packet of a user equipment accessing the relay node). Mapping of the data packet refers to transmitting the data packet to a correct backhaul channel for transmission.

For the nodes (such as a relay node, or a distributed unit of an anchor node, or a central unit of an anchor node, or an anchor node) in the relay network, a new address information (such as BAP address) is defined, which may be used to indicate a node in the relay network and used to route data packets in the relay network. If the data packet contains the BAP address of a node (such as a relay node, or a distributed unit of an anchor node, or a central unit of an anchor node, or an anchor node), it indicates that the destination receiving node of the data packet is such relay node, or a source transmitting node of the data packet is such node. Meanwhile, there may be multiple paths between the anchor node (or the central unit of the anchor node or the distributed unit of the anchor node) and the relay node. In order to indicate different paths, a Path ID is also defined. Different Path IDs indicate different paths to the same node. The Path ID of the data packet may also be included in the data packet. After a node in the relay network receiving a data packet, it will determine the next hop node of the data packet according to the BAP address and/or Path ID contained in the data packet, thereby completing the routing of the data packet.

In actual network, a relay node may be in a moving state, such as a relay node on a bus or train. In this scenario, the motion of the relay node will cause the overall motion of a user equipment accessing the relay node. How to solve the mobility problem of the relay node is a subject to be studied.

When the relay node is in a moving state, an upper-level (parent) node, or a distributed unit of an anchor node, or a central unit of the anchor node, or the anchor node, which is serving the relay node, may be changed. In order to continuously provide service for a user equipment by the relay node during its moving, the following technical problems are existed in existing technologies.

(1) A mobile terminal part of the relay node cannot continuously provide service for a backhaul link it serves.

(2) Configuration of a distributed unit part of the relay node may be changed as the node moves, so that it cannot provide service for a user equipment which accesses the node.

These problems cause a user equipment which accesses the relay node to lose their connection with the network, thus affecting the user's experience in the relay network.

In the present application, the anchor node may be an integrated base station, or a base station including a central unit of the anchor node and a distributed unit of the anchor node, or a base station including a control plane part of the central unit of the anchor node, an user plane part of the central unit of the anchor node, and the distributed unit of the anchor node. If the central unit of the anchor node is divided into a control plane part and a user plane part, the central unit of the anchor node in the present invention is used to indicate the control plane part (CU-CP) of the central unit of the anchor node.

In the present application, a relay node is a node including a mobile terminal part and a distributed unit part. This node is an IAB node.

In the present application, data transmitted on the backhaul link may be user plane data, such as data carried by DRB, and user plane data of F1 traffic, or control plane data, such as data carried by SRB, and control plane data of the F1 traffic, or data of an non-F1 traffic (such as data of IPSec protocol, data of SCTP protocol, data from OAM, and the like).

In the present application, a targeted user equipment may be a terminal user equipment, a relay node, or a mobile terminal part of the relay node.

In the present application, name of a message is just an example, and other names may be used to name the message. The sequence number of the message does not represent the order in which the messages are executed, but only the name of the message.

The moving scenarios of the relay node involved in the present application include the following three types of scenarios, as shown in FIG. 2.

Same central unit and same distributed unit of a same anchor node (intra-CU/intra-DU)

During handover of a relay node, the central unit of the anchor node and the distributed unit of the anchor node to which the relay node is connected (directly connected or connected through one or more relay nodes) have not been changed. As shown in FIG. 2(a), after the handover of the moving relay node, it is still connected to the same central unit and same distributed unit of the same anchor node.

Same central unit of a same anchor node/different distributed units of the same anchor node (intra-CU/inter-DU)

During handover of a relay node, the central unit of the anchor node to which the relay node is connected (directly connected or connected through one or more relay nodes) has not been changed, and the distributed unit of the anchor node to which the relay node is connected has been changed. As shown in FIG. 2(b), after the handover of the moving relay node, it is still connected to the same central unit of the same anchor node, but distributed unit of the anchor node changes from a distributed unit 1 of the anchor node to a distributed unit 2 of the anchor node.

Handover between different anchor nodes or central units of different anchor nodes (inter-CU)

During handover of a relay node, the central unit of anchor node, or the anchor node to which the relay node is connected (directly connected or connected through one or more relay nodes) has been changed. As shown in FIG. 2(c), after the handover of the moving relay node, central unit of the anchor node to which the relay node is connected is changed from a central unit of an anchor node 1 to a central unit of an anchor node 2, and distributed unit of anchor node to which the relay node is connected is changed from a distributed unit of the anchor node 1 to a distributed unit of the anchor node 2.

Embodiment 1

An embodiment of the present application provides a method for handover, which is applied to a first node. A schematic flowchart of the method is shown in FIG. 3, and the method includes:

Step S101: receiving a configuration message transmitted by a second node to support the first node for handover, wherein, the first node includes any one of a relay node, a mobile terminal part of the relay node, and a distributed unit of the relay node, and the second node includes any one of an anchor node, and a central unit of the anchor node.

Step S102: configuring the first node according to the configuration message transmitted by the second node.

In the embodiment of the present application, the configuration message transmitted by the second node to support the first node for handover is received. The first node includes any one of the relay node, the mobile terminal part of the relay node, and the distributed unit of the relay node. The second node includes any one of the anchor node, and the central unit of the anchor node. The first node is configured according to the configuration message transmitted by the second node. In this way, it achieves that the configuration of the first node is updated during the handover of the first node when moving, such as the configuration of the distributed unit part of the first node, the configuration of the mobile terminal part of the first node, and the like, so that the relay node may continuously provide service for a user equipment accessing the first node.

Optionally, the configuration message includes at least one of the followings:

address-related information required by the first node, information related to configuration of a backhaul channel, and data routing-related information.

Optionally, the configuration message may be a Radio Resource Control (RRC) Reconfiguration message, a RRC Connection Reconfiguration message, or other message.

Optionally, the address-related information required by the first node includes at least one of the followings:

address-related information of the first node side before the handover, address-related information of the first node side after the handover, address-related information of the second node side before the handover, address-related information of the second node side after the handover.

The address-related information of the first node side before the handover includes at least one of backhaul adaptation layer (BAP) address information of the relay node or the distributed unit of the relay node, address information of the relay node or the distributed unit of the relay node, one or more transmission layer address information used when transmitting control signaling at the relay node or the distributed unit side of the relay node, and one or more transmission layer address information used when transmitting user data at the relay node or the distributed unit side of the relay node.

The address-related information of the first node side after the handover includes at least one of BAP address information of the relay node or the distributed unit of the relay node, address information of the relay node or the distributed unit of the relay node, one or more transmission layer address information used when transmitting control signaling at the relay node or the distributed unit side of the relay node, and one or more transmission layer address information used when transmitting user data at the relay node or the distributed unit side of the relay node.

The address-related information of the second node side before the handover includes at least one of address information of the anchor node or the central unit of the anchor node, one or more transmission layer address information used when transmitting control signaling at the anchor node or the central unit side of anchor node, and one or more transmission layer address information used when transmitting user data at the anchor node or the central unit side of the anchor node.

The address-related information of the second node side after the handover includes at least one of address information of the anchor node or the central unit of the anchor node, one or more transmission layer address information used when transmitting control signaling at the anchor node or the central unit side of the anchor node, and one or more transmission layer address information used when transmitting user data at the anchor node or the central unit side of the anchor node.

Optionally, the information related to the configuration of the backhaul channel includes at least one of the followings: identification information of the backhaul channel, quality of service (QoS) parameter information of the backhaul channel, configuration information for serving the backhaul channel, information on mapping relationship between the backhaul channel and other backhaul channels before and after the handover of the relay node, information related to the data carried by the backhaul channel.

The information on the mapping relationship between the backhaul channel and other backhaul channels before and after the handover of the relay node includes at least one of information on the backhaul channel served by a mobile terminal part of the relay node before the handover of the relay node, information on the backhaul channel served by the mobile terminal part of the relay node after the handover of the relay node, information on the backhaul channel served by the mobile terminal part of the relay node, information on the backhaul channel served by the distributed unit of the relay node before the handover of the relay node, information on the backhaul channel served by the distributed unit of the relay node after the handover of the relay node, and information on the backhaul channel served by the distributed unit of the relay node.

The information related to the data carried by the backhaul channel includes at least one of information related to the user Data Radio Bearer (DRB) to which the data belongs, identification information of the QoS of the data, indication information of the type of control signaling to which the data belongs, indication information indicating that the type of the data is non-F1 traffic, information on a destination receiving node of the data, information on a source transmitting node of the data, tunnel endpoint identifier (TEID) (such as GTP-TEID) information of the data, indication information of content of information contained in the data, and path identification information of the data.

Optionally, the data routing-related information includes at least one of the followings:

BAP address information contained in a data packet, path identification information contained in a data packet, BAP routing identification information of a data packet, identification information of a node receiving a data packet transmitted by the relay node, identification information of a cell group used when the relay node transmits a data packet, and indication information of a cell group used when the relay node transmits a data packet.

An embodiment of the present application provides another method for handover, which is applied to a second node. A schematic flowchart of the method is shown in FIG. 4, and the method includes:

Step S201: transmitting a user context configuration request message to a third node to support a first node for handover, wherein, the first node includes any one of a relay node, a mobile terminal part of the relay node, and a distributed unit of the relay node, the second node includes any one of an anchor node, and a central unit of the anchor node, and the third node includes any one of distributed unit of the anchor node to which the first node is directly connected after the handover of the first node, or other relay node except the first node, to which the first node is directly connected after the handover of the first node; and Step S202: receiving a user context configuration response message transmitted by the third node.

Optionally, the user context configuration request message includes at least one of the followings:

one or more piece of the information contained in an existing UE context setup request or UE context modification request message, information related to the backhaul channel served by the distributed unit part of the third node, and data routing-related information.

The information related to the backhaul channel served by the distributed unit part of the third node includes at least one of identification information of the backhaul channel, QoS parameter information of the backhaul channel, and information related to the data carried by the backhaul channel.

Optionally, the user context configuration response message includes at least one of the followings:

one or more piece of the information contained in the existing UE context setup response or UE context modification response message, information on a backhaul channel accepted by the third node or the distributed unit of the third node, information on a backhaul channel not being accepted by the third node or the distributed unit of the third node, and configuration information on a backhaul channel generated by the third node or the distributed unit of the third node.

The embodiment of the present application has at least the following beneficial effects:

During the handover of the relay node when moving, the mobile terminal part of the relay node is configured (such as configuration of the backhaul channel, configurations of address-related information, and routing information, and the like), and the mobile terminal part of the relay node may continuously provide service for the backhaul link.

An embodiment of the present application provides another method for handover, which is applied to a second node. A schematic flowchart of the method is shown in FIG. 5, and the method includes:

Step S301: transmitting a handover request message to a fourth node to support a first node for handover, wherein, the first node includes any one of a relay node, a mobile terminal part of the relay node, and a distributed unit of the relay node, the second node includes any one of an anchor node to which the first node is connected before the handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

Step S302: receiving a handover response message transmitted by the fourth node.

Optionally, the handover request message includes at least one of the followings:

one or more piece of information contained in an existing handover request message, address-related information of the first node, information related to a backhaul channel served by the mobile terminal part of the first node, data routing-related information, configuration information of a distributed unit part of the first node, and information related to configuration of a user equipment served by the distributed unit part of the first node.

The address-related information of first node includes at least one of address-related information of the first node side before the handover, and address-related information of the second node side before the handover.

The configuration information of the distributed unit part of the first node includes at least one of identification information, identification information of an anchor node or a central unit of the anchor node being accessed, configuration information of a served cell, supported radio resource control (RRC) version information, and RRC version information of the anchor node or the central unit of the anchor node.

The configuration information of the served cell includes at least one of identification information of the cell, one or more piece of information contained in existing served cell information, system message information, and cell service status information.

The information related to the configuration of the user equipment served by the distributed unit part of the first node includes at least one of identification information of a user DRB, QoS-related information of a user DRB, identification information of a user signaling radio bearer (SRB), configuration information of the user equipment, and configuration information of general packet radio service (GPRS) tunneling protocol user plane (GTP-U) tunnel for receiving user DRB data at the central unit side of the second node.

Optionally, the handover response message includes at least one of the followings:

one or more piece of information contained in an existing handover request acknowledge message, address-related information of the first node, information related to the mobile terminal part of the first node, data routing-related information, configuration information of a distributed unit part of the first node, information on a cell to be activated, information on a cell to be deactivated, reason information for deactivating a cell, and information related to configuration of a user equipment served by the distributed unit part of the first node.

The address-related information of the first node includes at least one of address-related information of the first node side before the handover, address-related information of the second node side before the handover, address-related information of the first node side after the handover, and address-related information of the fourth node side after the handover.

The information related to the mobile terminal part of the first node includes at least one of identification information of the backhaul channel being accepted, identification information of the backhaul channel not being accepted, and configuration information related to the served backhaul channel.

The information related to the configuration of the user equipment served by the distributed unit part of the first node includes at least one of identification information of the a user DRB being accepted, identification information of a user DRB not being accepted, identification information of the user SRB being accepted, identification information of the user SRB not being accepted, configuration information of the user equipment, configuration information of GTP-U tunnel for receiving user DRB data at the distributed unit side of the first node, configuration information of GTP-U tunnel for receiving user DRB data at the distributed unit side of the first node before the handover, configuration information of GTP-U tunnel for receiving DRB data of the user equipment at the central unit side of the fourth node, and configuration information of GTP-U tunnel for receiving user DRB data at the central unit side of the second node before the handover.

The embodiment of the present application has at least the following beneficial effects:

during the handover of the relay node when moving, the configuration information (such as configuration of the backhaul channel, configuration of address-related information, and routing information, and the like) related to the mobile terminal part of the relay node interacts between the source node (such as the second node) and the target node (such as the fourth node), and thus the mobile terminal part of the relay node may continuously provide service for the backhaul link.

An embodiment of the present application provides another method for handover, which is applied to a first node. A schematic flowchart of the method is shown in FIG. 6, and the method includes:

Step S401: transmitting a first request message to a second node to support the first node for handover, wherein, the first node includes any one of a relay node, a mobile terminal part of the relay node, and a distributed unit of the relay node, and the second node includes any one of an anchor node, and a central unit of the anchor node; and Step S402: receiving a first response message transmitted by the second node.

Optionally, the first request message includes at least one of the followings:

address-related information of the first node, information related to configuration of the distributed unit of the first node, and assistant information for obtaining configuration information of the distributed unit of the first node.

The address-related information of the first node includes at least one of address-related information of the first node side before the handover, and address-related information of the second node side before the handover.

The information related to the configuration of the distributed unit of the first node includes at least one of information related to the configuration of the distributed unit of the first node before the handover, and information related to the configuration of the distributed unit of the first node after the handover.

The assistant information for obtaining the configuration information of the distributed unit of the first node includes at least one of information related to the mobile terminal part of the first node after the handover, information related to the mobile terminal part of the first node before the handover, and information related to the distributed unit of the first node before the handover.

Optionally, the first response message includes at least one of the followings:

information related to the configuration of the distributed unit of the first node after update, information related to the configuration of the distributed unit of the first node before update, information on the cell to be activated, information on the cell to be deactivated, reason information for deactivating the cell, and address-related information of the first node.

The address-related information of the first node includes at least one of address-related information of the first node side before the handover, address-related information of the second node side before the handover, address-related information of the first node side after the handover, and address-related information of the second node side after the handover.

The embodiment of the present application has at least the following beneficial effects:

during the handover of the relay node when moving, the configuration of the distributed unit part of the relay node is maintained or updated, so that the distributed unit part of the relay node may continuously provide service for a user equipment accessing the relay node.

An embodiment of the present application provides another method for handover, which is applied to a fourth node. A schematic flowchart of the method is shown in FIG. 7, and the method includes:

Step S501: receiving a first handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

Step S502: transmitting a first handover response message to the second node;

Step S503: receiving a second request message transmitted by the first node to support the first node for the handover, wherein, the first node includes any one of a relay node, a mobile terminal part of the relay node, and a distributed unit of the relay node; and Step S504: transmitting a second response message to the first node.

Optionally, the second request message includes at least one of the followings:

information related to configuration of the distributed unit of the first node before the handover, address-related information of the first node, and assistant information for obtaining configuration information of the distributed unit of the first node.

The address-related information of the first node includes any one of address-related information of the first node side before the handover, and address-related information of the second node side before the handover.

The assistant information for obtaining the configuration information of the distributed unit of the first node includes any one of the information related to the mobile terminal part of the first node after the handover, information related to the mobile terminal part of the first node before the handover, and information related to the distributed unit of the first node before the handover.

Optionally, the second response message includes at least one of the followings:

information related to configuration of the distributed unit of the first node, information on a cell to be activated, information on a cell to be deactivated, reason information for deactivating the cell, and address-related information of the first node.

The information related to the configuration of the distributed unit of the first node includes any one of information related to the configuration of the distributed unit of the first node before the handover, and the information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

The embodiment of the present application has at least the following beneficial effects:

during the handover of the relay node when moving, the configuration information related to the distributed unit part of the relay node interacts between the source node (such as the second node) and the target node (such as the fourth node), and the configuration of the distributed unit part of the relay node is maintained or updated, so that the distributed unit part of the relay node may continuously provide service for a user equipment accessing the relay node.

An embodiment of the present application provides another method for handover, which is applied to a second node. A schematic flowchart of the method is shown in FIG. 8, and the method includes:

Step S601: transmitting a second handover request message or a third handover request message to a fourth node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

Step S602: receiving a second handover response message corresponding to the second handover request message or a third handover response message corresponding to the third handover request message, transmitted by the fourth node; and Step S603: transmitting a first configuration message corresponding to the second handover response message or a second configuration message corresponding to the third handover response message to the first node to support the first node for the handover, wherein, the first node includes any one of a relay node, a mobile terminal part of the relay node, and a distributed unit of the relay node.

Optionally, the first configuration message or the second configuration message includes at least one of the followings:

information related to configuration of a distributed unit of the first node, information on a cell to be activated, information on a cell to be deactivated, reason information for deactivating the cell, and address-related information of the first node.

The information related to the configuration of the distributed unit of the first node includes any one of information related to the configuration of the distributed unit of the first node before the handover, and information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

Optionally, the second handover request message or the third handover request message includes at least one of the followings:

information related to the configuration of the distributed unit of the first node before the handover, and address-related information of the first node.

The address-related information of the first node includes any one of address-related information of the first node side before the handover, and address-related information of the second node side before the handover.

Optionally, the second handover response message or the third handover response message includes at least one of the followings:

address-related information of the first node, information of the cell to be activated, information of the cell to be deactivated, and reason information for deactivating the cell, The address-related information of the first node includes any one of address-related information of the first node side before the handover, and address-related information of the second node side after the handover.

Optionally, the address-related information of the first node includes any one of address-related information of the first node side before the handover, address-related information of the second node side before the handover, address-related information of the first node side after the handover, and address-related information of the second node side after the handover.

An embodiment of the present application provides another method for handover, which is applied to a fourth node. A schematic flowchart of the method is shown in FIG. 8-a, and the method includes:

Step S701: receiving a third handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node;

Step S702: transmitting a third handover response message to the second node; and Step S703: transmitting a second configuration message to the first node to support the first node for the handover, wherein, the first node includes any one of a relay node, a mobile terminal part of the relay node, and a distributed unit of the relay node.

The embodiment of the present application has at least the following beneficial effects:

during the handover of the relay node when moving, the configuration information related to the distributed unit part of the relay node interacts between the source node (such as the second node) and the target node (such as the fourth node), and the configuration of the distributed unit part of the relay node is maintained or updated, so that the distributed unit part of the relay node may continuously provide service for a user equipment accessing the relay node.

The following embodiments are used to describe the handover method in the foregoing embodiments of the present application in a comprehensive and detailed manner.

In the present application, the information involved in the signaling interaction process includes the following:

Address-related information required by the relay node. This information is address-related information required for communication between the distributed unit of the relay node and the anchor node or the central unit of the anchor node. The information includes at least one of the following information.

Address-related information of the relay node (or the distributed unit of the relay node) side before the handover. This information includes at least one of the following information.

BAP address information of the relay node (or the distributed unit of the relay node). This address information is used to indicate the relay node during the data packet routing process before the handover. Further, the information may include one or more BAP addresses. The address information may be named as old BAP address, or other names may be adopted.

Address information of the relay node (or the distributed unit of the relay node), such as IP address information. This address information is used to communicate with the anchor node (or the central unit of the anchor node) before the handover. The anchor node (or the central unit of the anchor node) is the node to which the relay node is connected before the handover. Further, the information may include one or more IP addresses. The address information may be named as old gNB-DU IP address, or other names may be adopted.

One or more transport layer address information used when transmitting control signaling at the relay node (or the distributed unit of the relay node) side, such as IP address and/or port information. Further, the one or more transport layer address information may also indicate whether the address information is used for transmitting UE-associated F1AP control signaling, or transmitting non-UE-associated F1AP control signaling, or all F1AP control signaling. The address information may be named as old control plane transport layer address of gNB-DU, or other names may be adopted.

One or more transport layer address information used when transmitting (such as receiving) user data at the relay node (or the distributed unit of the relay node) side, such as IP address, and/or tunnel endpoint identifier TEID (such as GTP-TEID (GTP Tunnel Endpoint Identifier). The address information may be named as old user plane transport layer address of gNB-DU, or other names may be adopted. Further, each piece of transport layer address information may correspond to a user DRB, and the information may also include user DRB information (such as user DRB identification information) corresponding to each transport layer address.

Address-related information of the anchor node (or the central unit of the anchor node) side before the handover. The anchor node (or the central unit of the anchor node) is the node to which the relay node is connected before the handover. This information includes at least one of the following information.

Address information of the anchor node (or the central unit of the anchor node), such as IP address information. Further, this information may include one or more IP addresses. The address information may be named as old gNB-CU IP address, or other names may be adopted.

One or more transport layer address information used when transmitting control signaling at the anchor node (or the central unit of the anchor node) side, such as IP address and/or port information. Further, the one or more transport layer address information may also indicate whether the address information is used for transmitting UE-associated F1AP control signaling, or transmitting non-UE-associated F1AP control signaling, or all F1AP control signaling. The address information may be named as old control plane transport layer address of gNB-CU, or other names may be adopted.

One or more transport layer address information used when transmitting user data at the anchor node (or the central unit of the anchor node) side, such as IP address, and/or TEID (such as GTP-TEID (GTP Tunnel Endpoint Identifier)). The address information may be named as old user plane transport layer address of gNB-CU, or other names may be adopted. Further, each piece of transport layer address information may correspond to a user DRB, and the information may also include user DRB information (such as user DRB identification information) corresponding to each transport layer address.

Address-related information of the relay node (or the distributed unit of the relay node) side after the handover. This information includes at least one of the following information.

BAP address information of the relay node (or the distributed unit of the relay node). This address information is used to indicate the relay node in the data packet routing process after the handover. Further, this information may include one or more IP addresses. The address information may be named as new BAP address, or other names may be adopted.

Address information of the relay node (or the distributed unit of the relay node), such as IP address information. This address information is used to communicate with the anchor node (or the central unit of the anchor node) after the handover. The anchor node (or the central unit of the anchor node) is the node to which the relay node is connected after the handover. Further, the information may include one or more IP addresses. The address information may be named as new gNB-DU IP address, or other names may be adopted.

One or more transport layer address information used when transmitting control signaling at the relay node (or the distributed unit of the relay node) side, such as IP address and/or port information. Further, the one or more transport layer address information may also indicate whether the address information is used for transmitting UE-associated F1AP control signaling, or transmitting non-UE-associated F1AP control signaling, or all F1AP control signaling. The address information may be named as new control plane transport layer address of gNB-DU, or other names may be adopted.

One or more transport layer address information used when transmitting (such as receiving) user data at the relay node (or the distributed unit of the relay node) side, such as IP address, and/or TEID (such as GTP-TEID (GTP Tunnel Endpoint Identifier). The address information may be named as new user plane transport layer address of gNB-DU, or other names may be adopted. Further, each piece of transport layer address information may correspond to a user DRB, and the information may also include user DRB information (such as user DRB identification information) corresponding to each transport layer address.

Address-related information of the anchor node (or the central unit of the anchor node) side after the handover. The anchor node (or the central unit of the anchor node) is the node to which the relay node is connected after the handover. The anchor node (or the central unit of the anchor node) may be same as or different with an anchor node (or a central unit of the anchor node) to which the relay node is connected before the handover. This information includes at least one of the following information.

Address information of the anchor node (or the central unit of the anchor node), such as IP address information. Further, this information may include one or more IP addresses. The address information may be named as new gNB-CU IP address, or other names may be adopted.

One or more transport layer address information used when transmitting control signaling at the anchor node (or the central unit of the anchor node) side, such as IP address and/or port information. Further, the one or more transport layer address information may also indicate whether the address information is used for transmitting UE-associated F1AP control signaling, or transmitting non-UE-associated F1AP control signaling, or all F1AP control signaling. The address information may be named as new control plane transport layer address of gNB-CU, or other names may be adopted.

One or more transport layer address information used when transmitting user data at the anchor node (or the central unit of the anchor node) side, such as IP address, and/or TEID (such as GTP-TEID (GTP Tunnel Endpoint Identifier). The address information may be named as new user plane transport layer address of gNB-CU, or other names may be adopted. Further, each piece of transport layer address information may correspond to a user DRB, and the information may also include user DRB information (such as user DRB identification information) corresponding to each transport layer address.

Further, the above information may reflect mapping relationship between each of them and the other, such as mapping relationship between the above-mentioned "address-related information of the relay node (or the distributed unit of the relay node) side before the handover" and "address-related information of the relay node (or the distributed unit of the relay node) side after the handover", and mapping relationship between the above-mentioned "address-related information of the anchor node (or the central unit of the anchor node) side before the handover" and "address-related information of the anchor node (or the central unit of the anchor node) side after the handover".

Configuration information related to the backhaul channel of the relay node. In one embodiment, the backhaul channel is a backhaul channel served by the mobile terminal part of the relay node before the handover. In one embodiment, the backhaul channel is a backhaul channel served by the mobile terminal part of the relay node after the handover. In one embodiment, the backhaul channel is a backhaul channel served by the distributed unit part of the relay node before the handover. In one embodiment, the backhaul channel is a backhaul channel served by the distributed unit part of the relay node after the handover. For a backhaul channel, this information includes at least one of the following information.

Identification information of the backhaul channel, such as ID of the backhaul channel.

QoS parameter information of the backhaul channel, see TS38.473.

Configuration information of the served backhaul channel, such as configuration of RLC layer, configuration information (such as identification information, and priority information of logical channel of backhaul link) of logical channel of the backhaul channel, configuration of MAC layer, and configuration of physical layer, see Cell Group Configuration.

Information on mapping relationship between the backhaul channel and other backhaul channels before and after the handover of the relay node, this information contains at least one of the following information.

Information 1: information of the backhaul channel served by the mobile terminal part of the relay node before the handover (such as identifier of the backhaul channel, logical channel identifier of the backhaul channel). Further, for this backhaul channel, identification information (such as a BAP address) of a upper-level (parent) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

Information 2: information of the backhaul channel served by the mobile terminal part of the relay node after the handover (such as identifier of the backhaul channel, logical channel identifier of the backhaul channel). Further, for this backhaul channel, identification information (such as a BAP address) of a upper-level (parent) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

Information 3: information of the backhaul channel served by the mobile terminal part of the relay node (such as identifier of the backhaul channel, logical channel identifier of the backhaul channel). Further, for this backhaul channel, identification information (such as a BAP address) of a upper-level (parent) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

Information 4: information of the backhaul channel served by the distributed unit of the relay node before the handover (such as identifier of the backhaul channel, logical channel identifier of the backhaul channel). Further, for this backhaul channel, identification information (such as a BAP address, C-RNTI, serving Cell ID, C-RNTI+serving Cell ID, and gNB-CU/gNB-DU UE F1AP ID) of a lower-level (child) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

Information 5: information of the backhaul channel served by the distributed unit of the relay node after the handover (such as identifier of the backhaul channel, logical channel identifier of the backhaul channel). Further, for this backhaul channel, identification information (such as a BAP address, C-RNTI, serving Cell ID, C-RNTI+serving Cell ID, and gNB-CU/gNB-DU UE F1AP ID) of a lower-level (child) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

Information 6: information of the backhaul channel served by the distributed unit of the relay node (such as identifier of the backhaul channel, logical channel identifier of the backhaul channel). Further, for this backhaul channel, identification information (such as a BAP address, C-RNTI, serving Cell ID, C-RNTI+serving Cell ID, and gNBCU/gNB-DU UE F1AP ID) of a lower-level (child) node serving the backhaul channel, or identification information (such as a Cell group ID) of a cell group serving the backhaul channel, or indication information of a cell group (such as MCG (master cell group), SCG (secondary cell group), and the like) serving the backhaul channel may also be included.

According to the above-mentioned six kinds of information, mapping relationship between the kinds of information may be reflected. If the above information reflects the mapping relationship between the backhaul channel served by the distributed unit of the relay node and the backhaul channel served by the mobile terminal part of the relay node, it represents that (all or part) data received on the backhaul channel served by the distributed unit of the relay node needs to be transmitted on the channel served by corresponding mobile terminal part of the relay node, and conversely, (all or part) data received on the backhaul channel served by the mobile terminal part of the relay node needs to be transmitted on the channel served by corresponding distributed unit part of the relay node.

Information related to the data carried by the backhaul channel. The data may be user plane data or control plane data, or may be user plane data or control plane data of F1 traffic. The data may be uplink data (data generated and transmitted by the relay node to the anchor node such as data generated by the distributed unit part of the relay node, or data forwarded by the relay node to the anchor node such as data received by the relay node from other nodes), and may also be downlink data (data transmitted by the anchor node to the relay node, which may be data transmitted to the distributed unit of the relay node, or data that is transmitted to other nodes but needs to be forwarded by the node), or may include both uplink data and downlink data. This information includes at least one of the following information.

Information related to a user DRB to which the data belongs, such as identification information of the user DRB (this information may indicate the user and DRB to which the data belongs).

Information related to a user SRB to which the data belongs, such as identification information of the user SRB (this information may indicate the user and the SRB to which the data belongs).

QoS identification information of the data. This information may be used to indicate the QoS information of the data. The identification information may also be used to indicate the user DRB.

Indication information of the type of control signaling to which the data belongs. The indicated types may include: non-UE associated F1AP signaling, UE-associated F1AP signaling, UE-associated F1AP signaling containing RRC message of SRB0, UE-associated F1AP signaling containing RRC message of SRB1, UE-associated F1AP signaling containing RRC message of SRB2, UE-associated F1AP signaling containing RRC message of SRB3, and UE-associated F1AP signaling without RRC message. Further, the indication information may be used to indicate a combination of one or more types described above, such as the types of the indication information being "UE-associated F1AP signaling containing RRC message of SRB0" and "UE-associated F1AP signaling without RRC message", and the types of the indication information being "UE-associated F1AP signaling containing RRC message of SRB0" and "non-UE associated F1AP signaling".

Indication information indicating that the type to which the data belongs is non-F1 traffic. The indication information indicates that the data carried by the backhaul channel is non-F1 traffic, such as data of IPSec Protocol, data of SCTP Protocol, data from OAM, and the like. Further, the indication information may also be used to indicate the type of the non-F1 traffic.

Information of destination receiving node of the data, such as IP address information and/or BAP address information. This node may be a relay node, an anchor node, a distributed unit of the anchor node or a central unit of the anchor node.

Information of source transmitting node of the data, such as IP address information and/or BAP address information. This node may be a relay node, an anchor node, a distributed unit of the anchor node or a central unit of the anchor node.

TEID information of the data, such as GTP-TEID (GTP Tunnel Endpoint Identifier). Different TEID information indicates different type of the data (such as different user DRB to which the data belongs). The TEID may be a TEID (UL TEID) assigned by the central unit of the anchor node, a TEID (DL TEID) assigned by the distributed unit of the relay node, or may include both the UL TEID and the DL TEID.

Information indicating the content of the information contained in the data, such as content information of Differentiated Services Code Point (DSCP) field contained in the data packet, and/or content information of flow label field, and/or content information of Traffic Class (TC) field, and/or content information of DS (DifferServ) field, and/or content information of ECN (Explicit Cogestion Notification) field.

Path identification information of the data, such as Path ID. The path indicated by this information is a path used for the data transmission in the relay network.

Data routing-related information of the relay node. The data may be uplink data (data generated and transmitted by the relay node to the anchor node, such as data generated by the distributed unit part of the relay node; or data forwarded by the relay node to the anchor node, such as data received by the relay node from other nodes), or downlink data (data transmitted by the anchor node to the relay node, which may be data transmitted to the distributed unit of the relay node, or data that is transmitted to other nodes but needs to be forwarded by that node), or may include both uplink data and downlink data. This information includes at least one of the following.

BAP address information contained in the data packet, such as BAP address. The information may be information of relay node before or after the handover, or may include both the information of relay node before and after the handover.

Path identification information contained in the data packet, such as Path ID. This information may be information of relay node before or after the handover, or may include both the information of relay node before and after the handover.

BAP routing identification information of the data packet. This information may indicate destination receiving node or source transmitting node of the data packet and path taken by routing the data packet, such as BAP address information+path identification information. This information may be information of relay node before or after the handover, or may include both the information of relay node before and after the handover.

Identification information of the node receiving the data packet transmitted by the relay node, such as BAP address information, and/or C-RNTI information, and/or C-RNTI+ identification information of served cell, and/or gNB-CU/ gNB-DU F1AP UE ID of the node, and the like. This information may be information of relay node before or after the handover, or may include both the information of relay node before and after the handover.

Identification information of the cell group used by the relay node to transmit the data packet, such as ID information of Cell group. This information may be information of relay node before or after the handover, or may include both the information of relay node before and after the handover.

Indication information of the cell group used by the relay node to transmit the data packet, such as MCG, and SCG. This information may be information of relay node before or after the handover, or may include both the information of relay node before and after the handover.

Configuration information of the distributed unit of the relay node. The information includes at least one of the following information.

Identification information, such as gNB-DU ID, and/or gNB-DU Name.

Identification information of an accessed anchor node (or the central unit of the anchor node), such as gNB ID, and/or gNB-CU ID, and/or gNB-CU Name, and/or gNB Name.

Configuration information of the served cell. This information includes at least one of the following information.

Identification information of a cell, such as NR CGI, and/or NR PCI.

One or more piece of information contained in the Served Cell Information defined in TS38.473.

System message information, such as MIB, SIB1, SIB2, . . . , one or more piece of information contained in gNB-DU System Information and gNB-CU System Information defined in TS38.473.

Cell service status information, such as in-service, out-of-service, and switching off ongoing, Service Status defined in TS38.473. Further, it may also indicate whether the cell is in an activated state or a deactivated state.

Supported RRC version information, seeing gNB-DU RRC Version in TS38.473.

RRC version information of the accessed anchor node (or the central unit of the anchor node), seeing gNB-DU RRC Version in TS38.473.

A first aspect of the present application: handover of a mobile terminal part of a relay node.

In order to support the handover of the mobile terminal part of the relay node, the relay node needs to perform the following signaling interaction with the accessed anchor node or the central unit of the accessed anchor node (the anchor unit or the central unit of the anchor node may be a node that is accessed before the handover, or a node that is accessed after the handover), as shown in FIG. 9 (a).

Step 1-1: The second node transmits a configuration message to the mobile terminal part of the first node. The first node is a relay node (or a distributed unit of the relay node). Further, handover occurs on the relay node. The second node is an anchor node (or a central unit of the anchor node). The anchor node (or the central unit of the anchor node) may be a node accessed before the handover or a node accessed after the handover. The configuration message may be RRC Reconfiguration message in TS38.331, or RRC Connection Reconfiguration message in TS36.331, or other messages. In addition to the information defined in the existing protocol, the message further includes at least one of the following information.

Address-related information required by the first node. This information includes at least one of the following information.

Address-related information of the first node side before the handover. This information may refer to the address-related information of the relay node (or the distributed unit of the relay node) side before the handover, which is contained in the "address-related information required by the relay node" in above.

Address-related information of the first node side after the handover. This information may refer to the address-related information of the relay node (or the distributed unit of the relay node) side after the handover, which is contained in the "address-related information required by the relay node" in above.

Address-related information of the second node side before the handover. This information may refer to the address-related information of the anchor node (or the central unit of the anchor node) side before the handover, which is contained in the "address-related information required by the relay node" in above.

Address-related information of the second node side after the handover. This information may refer to the address-related information of the anchor node (or the central unit of the anchor node) side after the handover, which is contained in the "address-related information required by the relay node" in above.

Information related to configuration of the backhaul channel. In one embodiment, the backhaul channel is served by the mobile terminal part of first node after the handover. For one backhaul channel, the information contained in this information related to the configuration of the backhaul channel may refer to the above-mentioned "configuration information related to the backhaul channel of the relay node".

Data routing-related information. In one embodiment, the information is used for data routing of the first node after the handover. The information contained in this data routing-related information may refer to the above-mentioned "data routing-related information of the relay node".

Step 1-1a: Optionally, the first node configures the first node according to the received configuration message.

Step 1-2: Optionally, the first node or the mobile terminal part of the first node feeds back a configuration completion message to the second node. The configuration message may be a RRC Reconfiguration Completion message in TS38.331 or RRC Connection Reconfiguration Completion message in TS36.331, or other messages.

The configuration message and the configuration completion message in the above steps may be directly interacted between the first node and the second node, or may be interacted between the first node and the second node through multiple intermediate nodes.

The effects of the above steps 1-1 and 1-2 are that the mobile terminal part of the first node may obtain the configuration information after the handover, thereby determining:

(1) Configuration information of the backhaul channel served by the mobile terminal part of the node after the handover, and/or (2) How to route the data packet received by the first node or the data packet generated by the first node, and/or (3) Backhaul channel required to transmit the data packet received by the first node or the data packet generated by the first node. The backhaul channel may be a backhaul channel served by the mobile terminal part of the first node, or a backhaul channel served by the distributed unit part of the first node.

In addition, before step 1-1, an interaction process between the second node and a third node may also be included. The third node is a node to which the first node is directly connected after the handover. The third node may be the distributed unit of the anchor node, or other relay node. The interaction process includes the following steps, as shown in FIG. 9 (b).

Step 1-1-1: The second node transmits a user context configuration request message to the third node (or the distributed unit part of the third node). The message may be a UE Context Setup/Modification request message defined on the F1 traffic, or other messages. The message is mainly used to perform the configuration required to provide services for the first node (or the mobile terminal part of the first node). The message includes at least one of the following information.

One or more piece of information contained in the UE Context Setup/Modification request message defined in the existing TS38.473 protocol.

Information related to the backhaul channel served by the distributed unit part of the third node. The information includes at least one of the following information.

Identification information of the backhaul channel.

QoS parameter information of the backhaul channel, seeing TS38.473.

Information related to the data carried by the backhaul channel. The data may be uplink data (data transmitted by the first node to the third node and forwarded by the third node to the anchor node), or downlink data (data transmitted by the anchor node to the third node and transmitted by the third node to the first node), or may include both uplink data and downlink data. The content contained in this information may refer to "information related to the data carried by the backhaul channel" in "information related to the configuration of the backhaul channel", defined in step 1-1.

Data routing-related information. The data may be uplink data (data transmitted by the first node to the third node and forwarded by the third node to the anchor node), or downlink data (data transmitted by the anchor node to the third node and transmitted by the third node to the first node), or may include both uplink data and downlink data. The content contained in this information may refer to "data routing-related information", defined in step 1-1.

Step 1-1-2: The third node (or the distributed unit part of the third node) transmits a user context configuration response message to the second node. The message may be a UE Context Setup/Modification response message defined on the F1 traffic, or other messages. The message is mainly used to feeds back the user context configuration request message. The message includes at least one of the following information.

One or more piece of information contained in the UE Context Setup/Modification response message defined in the existing TS38.473 protocol.

Information of the backhaul channel accepted by the third node (or the distributed unit part of the third node), such as identification information of the backhaul channel.

Information of the backhaul channel not accepted by the third node (or the distributed unit of the third node), such as identification information of the backhaul channel.

Configuration information of the backhaul channel generated by the third node (or the distributed unit of the third node), such as the configuration of the RLC layer, configuration information of a logical channel of the backhaul channel (such as identification information, and priority information of the logic channel of the backhaul channel), configuration of a MAC layer, configuration of a physical layer, and the like, seeing Cell Group Configuration.

The effects of the above steps 1-1-1 and 1-1-2 are that the third node may obtain the information required to serve the first node and generate the configuration information required to serve the first node, and the second node may obtain the configuration information of the third node when serving the first node and generate the configuration information for configuring the first node (such as generating one or more piece of configuration information required in step 1-1).

Further, when the handover of the first node occurs between central units of two different anchor nodes, as shown in the scenario shown in FIG. 2 (*c*), an interaction process between the second node and a fourth node may be further included. The second node is an anchor node or a central unit of the anchor node to which the first node is connected before the handover of the first node, and the fourth node is an anchor node or a central unit of the anchor node to which the first node is connected after the handover. The process includes the following steps, as shown in FIG. 9 (*c*).

Step 1-1-a: The second node transmits a handover request message to the fourth node. This message may be a Handover Request message on a X2/Xn interface, or other messages. This message is used to transmit the configuration information used by the first node when accessing the second node, to the fourth node. This message includes at least one of the following information.

One or more piece of information contained in the Handover Request message defined in the existing TS38.423 protocol or TS36.423 protocol.

Address-related information of the first node. This information includes at least one of the following information.

Address-related information of the first node side before the handover. This information may refer to the address-related information of the relay node (or the distributed unit of the relay node) side before the handover, which is contained in the "address-related information required by the relay node" in above.

Address-related information of the second node side before the handover. This information may refer to the address-related information of the anchor node (or the central unit of the anchor node) side before the handover, which is contained in the "address-related information required by the relay node" in above;

Information related to the backhaul channel served by the mobile terminal part of the first node. The backhaul channel is a channel served by the first node before the handover. The content contained in this information may refer to the above-mentioned "configuration information related to the backhaul channel of the relay node" (optionally, it does not include the information of the relay node after the handover, which is contained in the "configuration information related to the backhaul channel of the relay node").

Data routing-related information. The content contained in this information may refer to the above "data routing-related information of the relay node" (optional, it does not include the information of the relay node after the handover, which is contained in the "data routing-related information of the relay node").

Configuration information of the distributed unit part of the first node. The configuration information is the configuration information of the first node before the handover. The content contained in the configuration information may refer to the above-mentioned "configuration information of the distributed unit of the relay node".

Information related to the configuration of the user equipment served by the distributed unit part of the first node. The user accesses the network through the distributed unit part of the first node. The information includes at least one of the following information.

Identification information of a user DRB.

Information related to QoS of a user DRB.

Identification information of a user SRB.

Configuration information of the user equipment, such as PDCP configuration, RLC configuration, SDAP configuration, MAC configuration, physical layer configuration, and the like.

GTP-U (GPRS Tunneling Protocol-User plane) tunnel configuration information for receiving user DRB data at the distributed unit of the first node side, such as IP address, and/or TEID. Further, the configuration information is for each user DRB. When the user DRBs are different, the configuration information may be different. For configuration information of each GTP-U tunnel, a corresponding user DRB information (such as identification information of the user DRB) may be further included.

GTP-U tunnel configuration information for receiving user DRB data at the central unit side of the second node, such as IP address, and/or TEID. Further, the configuration information is for each user DRB. When the user DRB are different, the configuration information may be different. For configuration information of each GTP-U tunnel, a corresponding user DRB information (such as identification information of the user DRB) may be further included.

Step 1-1-b: The fourth node transmits a handover response message to the second node. This message may be a Handover Request Acknowledge message on an X2/Xn interface, or other messages. The message is used to transmit the configuration information used by the first node after accessing the fourth node, to the second node. The message includes at least one of the following information.

One or more piece of information contained in the Handover Request Acknowledge message defined in the existing TS38.423 protocol or TS36.423 protocol.

Address-related information of the first node. This information includes at least one of the following information.

Address-related information of the first node side before the handover. This information may refer to the address-related information of the relay node (or the distributed unit of the relay node) side before the handover, which is contained in the "address-related information required by the relay node" in above.

Address-related information of the second node side before the handover. This information may refer to the address-related information of the anchor node (or the central unit of the anchor node) side before the handover, which is contained in the "address-related information required by the relay node" in above.

Address-related information of the first node side after the handover. This information may refer to the address-related information of the relay node (or the distributed unit of the relay node) side after the handover, which is contained in the "address-related information required by the relay node" in above.

Address-related information of the fourth node side after the handover. This information may refer to the address-related information of the anchor node (or the central unit of the anchor node) side after the handover, which is contained in the "address-related information required by the relay node" in above.

Information related to the mobile terminal part of the first node. The information includes at least one of the following information.

Identification information of the backhaul channel being accepted, such as ID of the backhaul channel.
Identification information of the backhaul channel not being accepted, such as ID of the backhaul channel.

Configuration information related to the backhaul channel being served. The content contained in this information may refer to the above-mentioned "configuration information related to the backhaul channel of the relay node".

Data routing-related information. This information may refer to the "data routing-related information", defined in step 1-1.

Configuration information of the distributed unit part of the first node. This configuration information is the configuration information of the first node after the handover. The information included within it may refer to the above-mentioned "configuration information of the distributed unit of the relay node" (the anchor node (or the central unit of the anchor node) accessed by the relay node indicated in the information is the fourth node (or the central unit of the fourth node)). Further, the configuration information may further include the configuration information of the first node before the handover. The information included within it may refer to the above-mentioned "configuration information of the distributed unit of the relay node" (the anchor node (or the central unit of the anchor node) accessed by the relay node indicated in the information is the second node (or the central unit of the second node)).

Information on a cell to be activated, such as identification information of the cell (NR CGI, and NR PCI).

Information on a cell to be deactivated, such as identification information of the cell (NR CGI, and NR PCI).

Reason information for deactivating the cell, such as PCI collision, not supported by the tracking area (TA), and the like.

Information related to configuration of the user equipment served by the distributed unit part of the first node. The user accesses the network through the distributed unit part of the first node. The information includes at least one of the following information.

Identification information of a user DRB being accepted.
Identification information of a user DRB of not being accepted.
Identification information of a user SRB being accepted.
Identification information of a user SRB not being accepted.

Configuration information of the user equipment, such as PDCP configuration, RLC configuration, SDAP configuration, MAC configuration, physical layer configuration, and the like.

GTP-U tunnel configuration information for receiving DRB data of a user at the distributed unit side of the first node, such as IP address, and/or TEID. Further, the configuration information is for each user DRB. When the user DRB are different, the configuration information may be different. The configuration information further includes user DRB information (such as identification information of the user DRB) corresponding to the configuration information of each tunnel.

GTP-U tunnel configuration information for receiving user DRB data before the handover, at the distributed unit side of the first node, such as IP address, and/or TEID. Further, the configuration information is for each user DRB. When the user DRBs are different, the configuration information may be different. The configuration information further includes user DRB information (such as identification information of the user DRB) corresponding to the configuration information of each tunnel.

GTP-U tunnel configuration information for receiving user DRB data, at the central unit side of the fourth node, such as IP address, and/or TEID. Further, the configuration information is for DRB of each user. When the DRBs of users are different, the configuration information may be different. The configuration information further includes user DRB information (such as identification information of the user DRB) corresponding to the configuration information of each tunnel.

GTP-U tunnel configuration information for receiving user DRB data before the handover, at the central unit of the second node, such as IP address, and/or TEID. Further, the configuration information is for DRB of each user. When the DRBs of users are different, the configuration information may be different. The configuration information further includes user DRB information (such as identification information of the user DRB) corresponding to the configuration information of each tunnel.

After receiving the handover response message, the second node generates the configuration message in step 1-1 according to the information included in this message.

The effects of the above steps 1-1-a and 1-1-b are that when the relay node performs handover between the central units of two different anchor nodes, the central unit of the source anchor node (that is, the central unit of the second node) may transmit the configuration information (the configuration information includes the configuration information of the mobile terminal part of the relay node, the configuration information of the distributed unit part of the relay node, and the configuration information of the user equipment served by the distributed unit part of the relay node) of the relay node before the handover to the central unit of the target anchor node (that is, the central unit of the fourth node). The central unit of the target anchor node may perform the configuration of the relay node after the handover based on the received configuration information, and transmit the generated configuration information of the relay node, which is used after the handover, to the central unit of the source anchor node. Finally, the central unit of the source anchor node may transmit the configuration information used during or after the handover of the relay node to the relay node, so that the relay node may perform handover.

Further, in combination with different handover scenarios in FIG. 2, the signaling interaction process of the relay node handover is shown in FIG. 10. FIG. 10 (a) shows the handover process of the relay node in the central unit of the same anchor node, involving scenarios: intra-CU/intra-DU handover and intra-CU/inter-DU handover, and including the following steps.

Step 1-a: The second node transmits a user context configuration request message to the third node, which is a node directly accessed by the relay node after the handover (may be the distributed unit of the second node, which may be a distributed unit to which the relay node is connected before the handover, or another distributed unit, or another relay node). The content of the message may refer to the description in step 1-1-1 above.

Step 1-b: The third node transmits a user context configuration response message to the second node. The content of the message may refer to the description in step 1-1-2 above.

Step 1-c: The second node transmits a configuration message to the first node. The message may be transmitted by the second node to the first node through the third node, or may be transmitted by the second node to the first node through other nodes. The content of the message may refer to the description in step 1-1 above.

Step 1-d: The first node transmits a configuration completion message to the second node. The message may be transmitted by the first node to the second node through the third node, or may be transmitted by the first node to the second node through other nodes. The content of the message may refer to the description in step 1-2 above.

FIG. 10 (b) shows the signaling interaction process for the relay node to perform handover between central units of different anchor nodes, involving scenarios: inter-CU handover, and including the following steps.

Step 1-aa: The second node transmits a handover request message to the fourth node. The second node is a source anchor node (or a central unit of the source anchor node), and the fourth node is a target anchor node (or a central unit of the target anchor node). The content of the message may refer to the description in step 1-1-a.

Step 1-bb: The fourth node transmits a user context configuration request message to the third node. The third node is a node directly accessed by the relay node after the handover (may be the distributed unit of the fourth node, or may be another relay node). The content of the message may refer to the description in step 1-1-1 in above.

Step 1-cc: The third node transmits a user context configuration response message to the fourth node. The content of the message may refer to the description in step 1-1-2 in above.

Step 1-dd: The fourth node transmits a handover response message to the second node. The content of the message may refer to the description in step 1-1-b.

Step 1-ee: The second node transmits a configuration message to the first node. The content of the configuration message may refer to the description in step 1-1 in above.

Step 1-ff: The first node transmits a configuration completion message to the fourth node. The message may be transmitted by the first node to the fourth node through the third node, or may be transmitted by the first node to the fourth node through other nodes. The content of the configuration message may refer to the description in step 1-2 in above.

The effects of the above process are that the relay node may perform the handover within the same anchor node (or the central unit of the same anchor node) and between different anchor nodes (central units of different anchor nodes). During the handover, the backhaul channel served by the mobile terminal part of the relay node may be configured.

In a second aspect of the present application: configuration update and reconfiguration of the distributed unit part of the relay node when moving.

In addition to configuring the mobile terminal part of the relay node, the relay node also needs to configure the distributed unit of the relay node during the handover. Before the handover, the distributed unit of the relay node has the configuration information required to serve the user equipment at the source anchor node; after the handover, the configuration of the distributed unit of the relay node may need to be changed. The existing technology may not solve the problem of changing the configuration of the distributed unit part during the handover of the relay node.

To solve the above problem, the following methods are proposed in the present application. The following methods involve a first node, a second node, and a fourth node: the first node is a relay node where handover occurs; the second node is an anchor node (or a central unit of the anchor node), which may be a node to which the first node is connected before the handover of the first node, or may also be a node to which the first node is connected after the handover; and the fourth node is a target anchor node (or a central unit of the target anchor node) for the relay node performing the handover between different anchor nodes (or central units of the different anchor nodes), and at this time, the second node is a source anchor node (or a central unit of the source anchor node).

Method 1: The relay node provides updated configuration information to the anchor node.

As shown in FIG. 11, the method includes the following steps.

Step 2-1-1: The first node (or the distributed unit of the first node) transmits a first request message to the second node. The message is mainly used to provide the second node with information related to the configuration of the first node. The message includes at least one of the following information.

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.

Information related to the configuration of the distributed unit of the first node. This information includes at least one of the following information.
  Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).
  Information related to configuration of the distributed unit of the first node after the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node after the handover).

Assistant information for obtaining the configuration information of the distributed unit of the first node. The information is used to help the second node to obtain the configuration information of the distributed unit of the first node before the handover. The information includes at least one of the following information:
  After the handover, information related to the mobile terminal part of the first node, such as identification information of the mobile terminal part (such as C-RNTI, and gNB-CU/gNB-DU UE F1AP ID), accessed cell, and security-related information (such as short MAC-I).
  Before the handover, information related to the mobile terminal part of the first node, such as identification information of mobile terminal (such as C-RNTI, and gNB-CU/gNB-DU UE F1AP ID), accessed cell, and security-related information (such as short MAC-I).
  Before the handover, information related to the distributed unit of the first node, such as gNB-DU ID, gNB-DU Name, IP address, BAP address, and gNB ID to which the distributed unit of the first node belongs.

Step 2-1-2: The second node transmits a first response message to the first node (or the distributed unit of the first node). The message is mainly used to update the configuration of the first node (or the distributed unit of the first node). The message includes at least one of the following information:
  Information related to configuration of the distributed unit of the first node after update. This information is the update of the configuration of the distributed unit of the first node, which is performed by the second node according to the information received in step 2-1-1. The content contained in the information may refer to the above-mentioned "configuration information of the distributed unit of the relay node".
  Information related to the configuration of the distributed unit of the first node before the update. This information is the information received by the second node from step 2-1-1. The content included in the information may refer to the above-mentioned "configuration information of the distributed unit of the relay node".
  Information on a cell to be activated, such as identification information of the cell (NR CGI, and NR PCI).
  Information on a cell to be deactivated, such as identification information of the cell (NR CGI, and NR PCI).
  Reason information for deactivating a cell, such as PCI collision, not supported by the tracking area (TA), and the like.
  Address-related information of the first node. This information includes at least one of the following information.
    Address-related information of the first node side before the handover. This information may refer to the address-related information of the relay node (or the distributed unit of the relay node) side before the handover, which is contained in the "address-related information required by the relay node" in above.
    Address-related information of the second node side before the handover. This information may refer to the address-related information of the anchor node (or the central unit of the anchor node) side before the handover, which is contained in the "address-related information required by the relay node" in above.
    Address-related information of the first node side after the handover. This information may refer to the address-related information of the relay node (or the distributed unit of the relay node) side before the handover, which is contained in the "address-related information required by the relay node" in above.
    Address-related information of the second node side after the handover. This information may refer to the address-related information of the anchor node (or the central unit of the anchor node) side before the handover, which is contained in the "address-related information required by the relay node" in above.

In one embodiment, the above methods may be applied in the following scenario: after the handover, the relay node downloads the configuration information of the distributed unit part of the relay node from OAM (the information belongs to the configuration information after the handover), and then the relay node transmits its configuration information before and after the handover to the anchor node or the central unit of the anchor node accessed after the handover.

The above first request message and the above first response message may be F1 Setup Request/Response messages, gNB-DU Configuration Update/gNB-DU Configuration Update Acknowledge message, respectively, or other messages.

The effects of the above steps 2-1-1 and 2-1-2 are that the relay node where the handover occurs provides the anchor node with its configuration information before and after the handover. The anchor node to which the first node accesses after the handover reconfigures the distributed unit of the first node.

Method 2: The target anchor node configures the distributed unit of the relay node.

As shown in FIG. 12 (a), the method includes the following steps.

Step 2-2-1: The first node (or the distributed unit of the first node) transmits a second request message to the second node. The message is mainly used to provide the second node with information related to the configuration of the first node. The configuration information is the information before the handover, and the message includes at least one of the following information.

Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.

Assistant information for obtaining the configuration information of the distributed unit of the first node. The information is used to help the second node to obtain the configuration information of the distributed unit of the first node before the handover. The information includes at least one of the following information.
  After the handover, information related to the mobile terminal part of the first node, such as identification information of the mobile terminal part (such as C-RNTI, and gNB-CU/gNB-DU UE F1AP ID), accessed cell, and security-related information (such as short MAC-I).
  Before the handover, information related to the mobile terminal part of the first node, such as identification information of the mobile terminal part (such as C-RNTI, and gNB-CU/gNB-DU UE F1AP ID), accessed cell, and security-related information (such as short MAC-I).
  Before the handover, information related to the distributed unit of the first node, such as gNB-DU ID, gNB-DU Name, IP address, BAP address, and gNB ID to which the distributed unit of the first node belongs.

Step 2-2-2: The second node transmits a second response message to the first node (or the distributed unit of the first node). The message is mainly used to configure the first node (or the distributed unit of the first node). The message includes at least one of the following information.

Information related to the configuration of the distributed unit of the first node. This information includes at least one of the following information.
  Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).
  Information related to configuration of the distributed unit of the first node after the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node after the handover).

Information on a cell to be activated, such as identification information of the cell (NR CGI, and NR PCI).

Information on a cell to be deactivated, such as identification information of the cell (NR CGI, and NR PCI).

Reason information for deactivating a cell, such as PCI collision, and not supported by the tracking area (TA).

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.
  Address-related information of the first node side after the handover. This information may refer to the address-related information of the relay node (or the distributed unit of the relay node) side before the handover, which is contained in the "address-related information required by the relay node" in above.
  Address-related information of the second node side after the handover. This information may refer to the address-related information of the anchor node (or the central unit of the anchor node) side before the handover, which is contained in the "address-related information required by the relay node" in above.

Further, when the relay node performs the handover between two different anchor nodes (or central units of different anchor nodes), such as the handover from the second node to the fourth node, as shown in FIG. 12 (b), the above process is as following.

Step 2-2-a: The second node (or the central unit of the second node) transmits a first handover request message to the fourth node (or the central unit of the fourth node). The message is mainly used to transmit the configuration information of the first node in the second node to the fourth node. Information included in the first handover request message may refer to the content of step 1-1-a in the first aspect of the present invention.

Step 2-2-b: Optionally, the fourth node transmits a first handover response message to the second node. Information included in the first handover request message may refer to the content of step 1-1-b in the first aspect of the present invention.

Step 2-2-c: The first node transmits a second request message to the fourth node. This message is mainly used to provide the fourth node with information related to the configuration of the first node. The configuration information is the information before the handover. The message includes at least one of the following information.

Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.

Assistant information for obtaining the configuration information of the distributed unit the first node. The information is used to help the fourth node to obtain the configuration information of the distributed unit of the first node before the handover. The information includes at least one of the following information.
  After the handover, information related to the mobile terminal part of the first node, such as identification information of the mobile terminal part (such as C-RNTI, and gNB-CU/gNB-DU UE F1AP ID), accessed cell, and security-related information (such as short MAC-I).
  Before the handover, information related to the mobile terminal part of the first node, such as identification information of the mobile terminal part (such as C-RNTI, and gNB-CU/gNB-DU UE F1AP ID), accessed cell, and security-related information (such as short MAC-I).
  Before the handover, information related to the distributed unit of the first node, such as gNB-DU ID, gNB-DU Name, IP address, BAP address, and gNB ID to which the distributed unit of the first node belongs.

Step 2-2-d: The fourth node transmits a second response message to the first node. The message is mainly used to configure the first node (or the distributed unit of the first node). The message includes at least one of the following information.

Information related to the configuration of the distributed unit of the first node. This information includes at least one of the following information.

Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).

Information related to the configuration of the distributed unit of the first node after the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node after the handover).

Information on a cell to be activated, such as identification information of the cell (NR CGI, and NR PCI).

Information on a cell to be deactivated, such as identification information of the cell (NR CGI, and NR PCI).

Reason information for deactivating a cell, such as PCI collision, and not supported by the tracking area (TA).

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.
  Address-related information of the first node side after the handover. This information may refer to the address-related information of the relay node (or the distributed unit of the relay node) side before the handover, which is contained in the "address-related information required by the relay node" in above.
  Address-related information of the fourth node side after the handover. This information may refer to the address-related information of the anchor node (or the central unit of the anchor node) side before the handover, which is contained in the "address-related information required by the relay node" in above.

In one embodiment, the above steps may be applicable in the following scenario: after the handover, the relay node does not download new configuration information from OAM, and the relay node provides the anchor node (or the central unit of the anchor node) to which the relay node is connected after the handover with the configuration information of the distributed unit of the relay node before the handover, or the assistant information for helping the anchor node to which the relay node is connected after the handover to obtain the configuration information of the distributed unit of the relay node before the handover, and the anchor node (or the central unit of the anchor node) to which the relay node is connected after the handover updates the configuration information of the distributed unit of the relay node. The above second request message and the above second response message may be F1 Setup Request/Response messages, or gNB-DU Configuration Update/gNB- DU Configuration Update Acknowledge messages, respectively, or other messages. The above first handover request message and the above first handover response message may be Handover Request/Handover Request Acknowledge messages, respectively, or other messages.

The effects of the above process are that the anchor node (or the central unit of the anchor node) to which the relay node is connected after the handover may obtain the configuration information of the distributed unit the relay node before the handover from the relay node, and configure the distributed unit of the relay node according to the information.

Method 3: The source anchor node configures the distributed unit of the relay node.

As shown in FIG. 13, the method includes the following steps.

Step 2-3-1: The second node (or the central unit of the second node) transmits a second handover request message to the fourth node (or the central unit of the fourth node). The message is mainly used to transmit the configuration information of the first node in the second node to the fourth node. Information included in the second handover request message may refer to the content of step 1-1-a in the first aspect of the present invention.

Step 2-3-2: Optionally, the fourth node transmits a second handover response message to the second node. Information included in the second handover request message may refer to the content of step 1-1-b in the first aspect of the present invention.

Step 2-3-3: The second node transmits a first configuration message to the first node. The information included in the message includes at least one of the following information.

Information related to the configuration of the distributed unit of the first node. This information includes at least one of the following information.
  Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover).
  Information related to configuration of the distributed unit of the first node after the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node after the handover).

Information on a cell to be activated, such as identification information of the cell (NR CGI, and NR PCI).

Information on a cell to be deactivated, such as identification information of the cell (NR CGI, and NR PCI).

Reason information for deactivating a cell, such as PCI collision, and not supported by the tracking area (TA).

Address-related information of the first node. This information includes at least one of the following information.
  Address-related information of the first node side before the handover. This information may refer to the address-related information of the relay node (or the distributed unit of the relay node) side before the handover, which is contained in the "address-related information required by the relay node" in above.
  Address-related information of the second node side before the handover. This information may refer to the address-related information of the anchor node (or the central unit of the anchor node) side before the handover, which is contained in the "address-related information required by the relay node" in above.
  Address-related information of the first node side after the handover. This information may refer to the address-related information of the relay node (or the distributed unit of the relay node) side before the handover, which is contained in the "address-related information required by the relay node" in above.
  Address-related information of the fourth node side after the handover. This information may refer to the address-related information of the anchor node (or the central unit of the anchor node) side before the handover, which is contained in the "address-related information required by the relay node" in above.

In one embodiment, the above method may be applied in the following scenario: during the handover, the target anchor node (or the central unit of the target anchor node) generates configuration of the distributed unit of the relay unit after the handover, and then the configuration is transmitted by the source node to the relay node.

The above second handover request message and the above second handover response message may be Handover Request/Handover Request Acknowledge messages, respectively, or other messages. The above first configuration message may be a RRC Reconfiguration message or a RRC Connection Reconfiguration message, a gNB-CU Configuration Update message, a gNB-DU Configuration Update Acknowledge message, or other message.

The effects of the above process are that the source anchor node (or the central unit of the source anchor node) accessed by the relay node obtains the updated configuration information of the relay node from the target anchor node (or the central unit of the target anchor node), and transmits the updated configuration information to the relay node.

Method 4: After the handover of the relay node, the distributed unit of the relay node maintains connection with the central unit of the source anchor node.

In this method, after the handover of the relay node, only the mobile terminal part of the relay node is served by the target anchor node (or the central unit of the target anchor node), and the distributed unit part of the relay node also maintains connection with the source anchor node (or the central unit of the source anchor node), as shown in FIG. 14. In FIG. 14, the mobile terminal part of the first node communicates with the fourth node or the central unit of the fourth node after the handover through one or more intermediate nodes. The distributed unit part of the first node still communicates with the second node or the central unit of the second node after the handover of the mobile terminal part through one or more intermediate nodes. The data packets transmitted during the communication needs to be transmitted by the mobile terminal part of the first node. In this method, since the distributed unit part of the first node still maintains connection with the second node or the central unit of the second node, the configuration information of the distributed unit may remain unchanged. In order to implement this method, the following signaling interaction process is required, as shown in FIG. 15 (a).

Step 2-4-1: The second node transmits a third handover request message to the fourth node. The message includes at least one of the following information.

Information related to the configuration of the distributed unit of the first node before the handover. The content contained in this information may refer to the above-mentioned "configuration information of the distributed unit of the relay node" (the anchor node (or the central unit of the anchor node) accessed by the relay node involved in this information is an anchor node (or a central unit of the anchor node) accessed by the first node before the handover, that is, the second node (or the central unit of the second node)).

Address-related information of the first node. This information includes at least one of the following information.

Address-related information of the first node side before the handover. This information may refer to the address-related information of the relay node (or the distributed unit of the relay node) side before the handover, which is contained in the "address-related information required by the relay node" in above.

Address-related information of the second node side before the handover. This information may refer to the address-related information of the anchor node (or the central unit of the anchor node) side before the handover, which is contained in the "address-related information required by the relay node" in above.

Step 2-4-2: The fourth node transmits a third handover response message to the second node. The message includes at least one of the following information.

Address-related information of the first node, this information includes at least one of the following information:

Address-related information of the first node before the handover. This information may refer to the address-related information of the relay node (or the distributed unit of the relay node) side before the handover, which is contained in the "address-related information required by the relay node" in above.

Address-related information of the first node side after the handover. This information may refer to the address-related information of the relay node (or the distributed unit of the relay node) side before the handover, which is contained in the "address-related information required by the relay node" in above.

Information on a cell to be activated, such as identification information of one or more cells, such as NR CGI, and NR PCI.

Information on a cell to be deactivated, such as identification information of one or more cells, such as NR CGI, and NR PCI.

Reason information for deactivating a cell, such as PCI collision, and not supported by the tracking area (TA).

Step 2-4-3: The second node transmits a second configuration message to the first node. The message includes one of the following information at least.

Address-related information of the first node. This information includes one of the following information at least.

Address-related information of the first node side before the handover. This information may refer to the address-related information of the relay node (or the distributed unit of the relay node) side before the handover, which is contained in the "address-related information required by the relay node" in above.

Address-related information of the second node side before the handover. This information may refer to the address-related information of the anchor node (or the central unit of the anchor node) side before the handover, which is contained in the "address-related information required by the relay node" in above.

Address-related information of the first node side after the handover. This information may refer to the address-related information of the relay node (or the distributed unit of the relay node) side before the handover, which is contained in the "address-related information required by the relay node" in above.

Address-related information of the second node side after the handover. This information may refer to the address-related information of the anchor node (or the central unit of the anchor node) side before the handover, which is contained in the "address-related information required by the relay node" in above.

Information on a cell to be activated, such as identification information of one or more cells, such as NR CGI, and NR PCI.

Information on a cell to be deactivated, such as identification information of one or more cells, such as NR CGI, and NR PCI.

Reason information for deactivating a cell, such as PCI collision, and not supported by the tracking area (TA).

Another embodiment of the step 2-4-3 is that the fourth node transmits the second configuration message to the first node, as shown in FIG. 15 (b).

The above third handover request message and the above third handover response message may be Handover Request/Handover Request Acknowledge messages, respectively, or other messages. The above second configuration message may be a RRC Reconfiguration message or a RRC Connection Reconfiguration message, a gNB-CU Configuration Update message, a gNB-DU Configuration Update Acknowledge message, or other message.

The effects of the above process are that the relay node may maintain the connection with the source anchor node or the central unit of the source anchor node after the handover, and obtain the configuration information of the relay node to be updated through information interaction between the target anchor node or the central unit of the target anchor node and the source anchor node or the central unit of the source anchor node, so as to transmit the updated configuration information to the relay node.

Embodiment 2

Based on the same inventive concept with that of the foregoing embodiments, an embodiment of the present application further provides a first node device. A schematic structural diagram of the device is shown in FIG. 16. The first node device 10 includes a first processing module 101 and a second processing module 102.

The first processing module 101 is configured to receive a configuration message transmitted by a second node to support a first node for handover, wherein, the first node includes any one of a relay node, a mobile terminal part of the relay node, and a distributed unit of the relay node, and the second node includes any one of an anchor node, and a central unit of the anchor node.

The second processing module 102 is configured to configure the first node according to the configuration message transmitted by the second node.

Optionally, the configuration message includes at least one of the followings:

address-related information required by the first node, information related to the configuration of a backhaul channel, and data routing-related information.

Optionally, the above configuration message may be a RRC Reconfiguration message, a RRC Connection Reconfiguration message, or other message.

Optionally, the address-related information required by the first node includes at least one of the followings:

address-related information of the first node side before the handover, address-related information of the first node side after the handover, address-related information of the second node before the handover, and address-related information of the second node side after the handover.

The address-related information of the first node side before the handover includes at least one of Backhaul Adaptation layer (BAP) address information of the relay node or the distributed unit of the relay node, address information of the relay node or the distributed unit of the relay node, one or more transmission layer address information used when transmitting control signaling at the relay node side or the distributed unit side of the relay node, and one or more transmission layer address information used when transmitting user data at the relay node side or the distributed unit side of the relay node.

The address-related information of the first node side after the handover includes at least one of BAP address information of the relay node or the distributed unit of the relay node, address information of the relay node or the distributed unit of the relay node, one or more transmission layer address information used when transmitting control signaling at the relay node side or the distributed unit side of the relay node, and one or more transmission layer address information used when transmitting user data at the relay node side or the distributed unit side of the relay node.

The address-related information of the second node side before the handover includes at least one of address information of the anchor node or the central unit of the anchor node, one or more transmission layer address information used when transmitting control signaling at the anchor node side or the central unit side of the anchor node, and one or more transmission layer address information used when transmitting user data at the anchor node side or the central unit side of the anchor node.

The address-related information of the second node side after the handover includes at least one of address information of the anchor node or the central unit of the anchor node, one or more transmission layer address information used when transmitting control signaling at the anchor node side or the central unit side of the anchor node, and one or more transmission layer address information used when transmitting user data at the anchor node or the central unit side of the anchor node.

Optionally, the information related to the configuration of the backhaul channel includes at least one of the followings:

identification information of the backhaul channel, quality of service (QoS) parameter information of the backhaul channel, configuration information serving the backhaul channel, information on mapping relationship between the backhaul channel and other backhaul channels before and after the handover of the relay node, and information related to the data carried by the backhaul channel.

The information on the mapping relationship between the backhaul channel and other backhaul channels before and after the handover of the relay node includes at least one of information on the backhaul channel served by a mobile terminal part of the relay node before the handover of the relay node, information on the backhaul channel served by the mobile terminal of the relay node after the handover of the relay node, information of the backhaul channel served by the mobile terminal part of the relay node, information of the backhaul channel served by the distributed unit of the relay node before the handover of the relay node, information of the backhaul channel served by the distributed unit of the relay node after the handover of the relay node, and information of the backhaul channel served by the distributed unit of the relay node.

The information related to the data carried by the backhaul channel includes at least one of information related to the user Data Radio Bearer (DRB) to which the data belongs, identification information of the QoS of the data, indication information of the type of control signaling to which the data belongs, indication information indicating that the type of the data is non-F1 traffic, information of a destination receiving node of the data, information of a source transmitting node of the data, tunnel endpoint identifier (TEID) information of the data, indication information of content of the information contained in the data, and path identification information of the data.

Optionally, the data routing-related information includes at least one of the followings:

BAP address information included in a data packet, path identification information included in a data packet, BAP routing identification information of a data packet, identification information of a node receiving a data packet transmitted by the relay node, identification information of a cell group used when the relay node transmits a data packet, and indication information of a cell group used when the relay node transmits a data packet.

The embodiments of the present application have at least the following beneficial effects:

In the embodiment of the present application, the configuration message transmitted by the second node to support the first node for handover is received. The first node includes any one of the relay node, the mobile terminal part of the relay node, and the distributed unit of the relay node. The second node includes any one of the anchor node, and the central unit of the anchor node. The first node is configured according to the configuration message transmitted by the second node. In this way, it achieves that the configuration of the first node is updated, during the handover when the first node is moving, such as the configuration of the distributed unit part of the first node, the configuration of the mobile terminal part of the first node, and the like, so that the relay node may continuously provide service for a user equipment accessing the first node.

The content that is not described in detail in the first node device provided in the embodiment of the present application may refer to the foregoing handover method. The beneficial effects that may be achieved by the first node device provided in the embodiment of the present application are the same as that of the foregoing handover method, and are not repeated here.

Based on the same inventive concept with that of the foregoing embodiments, an embodiment of the present application further provides a second node device. A schematic structural diagram of the device is shown in FIG. 17. The second node device 20 includes a third processing module 201 and a fourth processing module 202.

The third processing module 201 is configured to transmit a user context configuration request message to a third node to support a first node for handover, wherein, the first node includes any one of a relay node, a mobile terminal part of the relay node, and a distributed unit of the relay node, the second node includes any one of an anchor node, and a central unit of the anchor node, and the third node includes any one of distributed unit of the anchor node to which the first node is directly connected after the handover, or other relay node except the first node, to which the first node is directly connected after the handover.

The fourth processing module 202 is configured to receive a user context configuration response message transmitted by the third node.

Optionally, the user context configuration request message includes at least one of the followings:

one or more piece of information contained in an existing UE context setup request or UE context modification request message, information related to the backhaul channel served by the distributed unit part of the third node, and data routing-related information.

The information related to the backhaul channel served by the distributed unit part of the third node includes at least one of identification information of the backhaul channel, QoS parameter information of the backhaul channel, and information related to the data carried by the backhaul channel.

Optionally, the user context configuration response message includes at least one of the followings:

one or more piece of information contained in the existing UE context setup response or UE context modification response message, information on a backhaul channel accepted by the third node or the distributed unit of the third node, information on a backhaul channel not being accepted by the third node or the distributed unit of the third node, and configuration information on a backhaul channel generated by the third node or the distributed unit of the third node.

The embodiments of the present application have at least the following beneficial effects:

the configuration of the relay node is updated during the handover of the relay node when moving, such as the configuration of the distributed unit part of the first node, the configuration of the mobile terminal part of the first node, and the like, so that the relay node may continuously provide service for a user equipment accessing the first node.

The content that is not described in detail in the second node device provided in the embodiment of the present application may refer to the foregoing handover method. The beneficial effects that may be achieved by the second node device provided in the embodiment of the present application are the same as that of the foregoing handover method, and are not repeated here.

Based on the same inventive concept with that of the foregoing embodiments, an embodiment of the present application further provides a second node device. A schematic structural diagram of the device is shown in FIG. 18. The second node device 30 includes a fifth processing module 301 and a sixth processing module 302.

The fifth processing module 301 is configured to transmit a handover request message to a fourth node to support a first node for handover, wherein, the first node includes any one of a relay node, a mobile terminal part of the relay node, and a distributed unit of the relay node, the second node includes any one of an anchor node to which the first node is connected before the handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node.

The sixth processing module 302 is configured to receive a handover response message transmitted by the fourth node.

Optionally, the handover request message includes at least one of the followings:

one or more piece of information contained in an existing handover request message, address-related information of the first node, information related to the backhaul channel served by the mobile terminal part of the first node, data routing-related information, configuration information of a distributed unit part of the first node, and information related to configuration of a user equipment served by the distributed unit part of the first node.

The address-related information of first node includes at least one of address-related information of the first node side before the handover, and address-related information of the second node side before the handover.

The configuration information of the distributed unit part of the first node includes at least one of identification information, identification information of an anchor node or a central unit of the anchor node being accessed, configuration information of a served cell, supported radio resource control (RRC) version information, and RRC version information of the anchor node or the central unit of the anchor node.

The configuration information of the served cell includes at least one of identification information of the cell, one or more piece of information contained in existing served cell information, system message information, and cell service status information.

The information related to the configuration of the user equipment served by the distributed unit part of the first node includes at least one of identification information of a user DRB, QoS-related information of a user DRB, identification information of a user signaling radio bearer (SRB), configuration information of a user equipment, and configuration information of general packet radio service (GPRS) tunneling protocol user plane (GTP-U) tunnel for receiving user DRB data at the central unit side of the second node.

Optionally, the handover response message includes at least one of the followings:

one or more piece of information contained in an existing handover request acknowledge message, address-related information of the first node, information related to the mobile terminal part of the first node, data routing-related information, configuration information of a distributed unit part of the first node, information on a cell to be activated, information on a cell to be deactivated, reason information for deactivating a cell, and information related to configuration of a user equipment served by the distributed unit part of the first node.

The address-related information of the first node includes at least one of address-related information of the first node side before the handover, address-related information of the second node side before the handover, address-related information of the first node side after the handover, and address-related information of the fourth node side after the handover.

The information related to the mobile terminal part of the first node includes at least one of identification information of the backhaul channel being accepted, identification information of the backhaul channel not being accepted, and configuration information related to the served backhaul channel.

The information related to the configuration of the user equipment served by the distributed unit part of the first node includes at least one of identification information of the user DRB being accepted, identification information of the user DRB not being accepted, identification information of the user SRB being accepted, identification information of the user SRB not being accepted, configuration information of the user equipment, configuration information of GTP-U tunnel for receiving user DRB data at the distributed unit side of the first node, configuration information of GTP-U tunnel for receiving user DRB data at the distributed unit side of the first node before the handover, configuration information of GTP-U tunnel for receiving user DRB data at the central unit side of the fourth node, and configuration information of GTP-U tunnel for receiving user DRB data at the central unit side of the second node before the handover.

The embodiments of the present application have at least the following beneficial effects:

during the handover of the relay node when moving, the configuration of the relay node is updated, such as the configuration of the distributed unit part of the first node, the configuration of the mobile terminal part of the first node, and the like, so that the relay node may continuously provide service for a user equipment accessing the first node.

The content that is not described in detail in the second node device provided in the embodiment of the present application may refer to the foregoing handover method. The beneficial effects that may be achieved by the second node device provided in the embodiment of the present application are the same as that of the foregoing handover method, and are not repeated here.

Based on the same inventive concept with that of the foregoing embodiments, an embodiment of the present application further provides a first node device. A schematic structural diagram of the device is shown in FIG. 19. The first node device 40 includes a seventh processing module 401 and an eighth processing module 402.

The seventh processing module 401 is configured to transmit a first request message to a second node to support a first node for handover, wherein, the first node includes any one of a relay node, a mobile terminal part of the relay node, and a distributed unit of the relay node, and the second node includes any one of an anchor node, and a central unit of the anchor node.

The eighth processing module 402 is configured to receive a first response message transmitted by the second node.

Optionally, the first request message includes at least one of the followings:

address-related information of the first node, information related to configuration of the distributed unit of the first node, and assistant information for obtaining configuration information of the distributed unit of the first node.

The address-related information of the first node includes at least one of address-related information of the first node side before the handover, and address-related information of the second node side before the handover.

The information related to the configuration of the distributed unit of the first node includes at least one of information related to the configuration of the distributed unit of the first node before the handover, and information related to the configuration of the distributed unit of the first node after the handover.

The assistant information for obtaining the configuration information of the distributed unit of the first node includes at least one of information related to the mobile terminal part of the first node after the handover, information related to the mobile terminal part of the first node before the handover, and information related to the distributed unit of the first node before the handover.

Optionally, the first response message includes at least one of the followings:

information related to configuration of the distributed unit of the first node after update, information related to configuration of the distributed unit of the first node before the update, information on a cell to be activated, information on a cell to be deactivated, reason information for deactivating a cell, and address-related information of the first node.

The address-related information of the first node includes at least one of address-related information of the first node side before the handover, address-related information of the second node side before the handover, address-related information of the first node side after the handover, and address-related information of the second node side after the handover.

The embodiments of the present application have at least the following beneficial effects:

during the handover of the relay node when moving, the configuration of the relay node is updated, such as the configuration of the distributed unit part of the first node, the configuration of the mobile terminal part of the first node, and the like, so that the relay node may continuously provide service for a user equipment accessing the first node.

The content that is not described in detail in the first node device provided in the embodiment of the present application may refer to the foregoing handover method. The beneficial effects that may be achieved by the first node device provided in the embodiment of the present application are the same as that of the foregoing handover method, and are not repeated here.

Based on the same inventive concept with that of the foregoing embodiments, an embodiment of the present application further provides a fourth node device. A schematic structural diagram of the device is shown in FIG. 20. The fourth node device 50 includes a ninth processing module 501, a tenth processing module 502, an eleventh processing module 503, and a twelfth processing module 504.

The ninth processing module 501 is configured to receive a first handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node.

The tenth processing module 502 is configured to transmit a first handover response message to the second node.

The eleventh processing module 503 is configured to receive a second request message transmitted by the first node to support the first node for the handover, wherein, the first node includes any one of a relay node, a mobile terminal part of the relay node, and a distributed unit of the relay node.

The twelfth processing module 504 is configured to transmit a second response message to the first node.

Optionally, the second request message includes at least one of the followings:

information related to configuration of the distributed unit of the first node before the handover, address-related information of the first node, and assistant information for obtaining configuration information of the distributed unit of the first node.

The address-related information of the first node includes any one of address-related information of the first node side before the handover, and address-related information of the second node side before the handover.

The assistant information for obtaining the configuration information of the distributed unit of the first node includes any one of the information related to the mobile terminal part of the first node after the handover, information related to the mobile terminal part of the first node before the handover, and information related to the distributed unit of the first node before the handover.

Optionally, the second response message includes at least one of the followings:

information related to configuration of the distributed unit of the first node, information on a cell to be activated, information on a cell to be deactivated, reason information for deactivating a cell, and address-related information of the first node.

The information related to the configuration of the distributed unit of the first node includes any one of information related to the configuration of the distributed unit of the first node before the handover, and the information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

The embodiments of the present application have at least the following beneficial effects:

during the handover of the relay node when moving, the configuration of the relay node is updated, such as the configuration of the distributed unit part of the first node, the configuration of the mobile terminal part of the first node, and the like, so that the relay node may continuously provide service for a user equipment accessing the first node.

The content that is not described in detail in the fourth node device provided in the embodiment of the present application may refer to the foregoing handover method. The beneficial effects that may be achieved by the fourth node device provided in the embodiment of the present application are the same as that of the foregoing handover method, and are not repeated here.

Based on the same inventive concept with that of the foregoing embodiments, an embodiment of the present application further provides a second node device. A schematic structural diagram of the device is shown in FIG. 21. The second node device 60 includes a thirteenth processing module 601, a fourteenth processing module 602, and a fifteenth processing module 603.

The thirteenth processing module 601 is configured to transmit a second handover request message or a third handover request message to a fourth node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node.

The fourteenth processing module 602 is configured to receive a second handover response message corresponding to the second handover request message or a third handover response message corresponding to the third handover request message, transmitted by the fourth node.

The fifteenth processing module 603 is configured to transmit a first configuration message corresponding to the second handover response message or a second configuration message corresponding to the third handover response message to the first node to support the first node for the handover, wherein, the first node includes any one of a relay node, a mobile terminal part of the relay node, and a distributed unit of the relay node.

Optionally, the first configuration message or the second configuration message includes at least one of the followings:

information related to configuration of a distributed unit of the first node, information on a cell to be activated, information on a cell to be deactivated, reason information for deactivating a cell, and address-related information of the first node.

The information related to the configuration of the distributed unit of the first node includes any one of information related to the configuration of the distributed unit of the first node before the handover, and information related to the configuration of the distributed unit of the first node after the handover.

The address-related information of the first node includes any one of address-related information of the first node side before the handover, address-related information of the second node side before the handover, address-related information of the first node side after the handover, and address-related information of the fourth node side after the handover.

Optionally, the second handover request message or the third handover request message includes at least one of the followings:

information related to the configuration of the distributed unit of the first node before the handover, and address-related information of the first node.

The address-related information of the first node includes any one of address-related information of the first node side before the handover, and address-related information of the second node side before the handover.

Optionally, the second handover response message or the third handover response message includes at least one of the followings:

address-related information of the first node, information of the cell to be activated, information of the cell to be deactivated, and reason information for deactivating the cell, The address-related information of the first node includes any one of address-related information of the first node side before the handover, and address-related information of the first node side after the handover.

Optionally, the address-related information of the first node includes any one of address-related information of the first node side before the handover, address-related information of the second node side before the handover, address-related information of the first node side after the handover, and address-related information of the second node side after the handover.

The embodiments of the present application have at least the following beneficial effects:

during the handover of the relay node when moving, the configuration of the relay node is updated, such as the configuration of the distributed unit part of the first node, the configuration of the mobile terminal part of the first node, and the like, so that the relay node may continuously provide service for a user equipment accessing the first node.

The content that is not described in detail in the second node device provided in the embodiment of the present application may refer to the foregoing handover method. The beneficial effects that may be achieved by the second node device provided in the embodiment of the present application are the same as that of the foregoing handover method, and are not repeated here.

Based on the same inventive concept with that of the foregoing embodiments, an embodiment of the present application further provides a fourth node device. A schematic structural diagram of the device is shown in FIG. 22. The fourth node device 70 includes a sixteenth processing module 701, a seventeenth processing module 702, and an eighteenth processing module 703.

The sixteenth processing module 701 is configured to receive a third handover request message transmitted by a second node, wherein, the second node includes any one of an anchor node to which a first node is connected before handover of the first node, and a central unit of the anchor node to which the first node is connected before the handover of the first node, and the fourth node includes any one of an anchor node to which the first node is connected after the handover of the first node, and a central unit of the anchor node to which the first node is connected after the handover of the first node.

The seventeenth processing module 702 is configured to transmit a third handover response message to the second node.

The eighteenth processing module 703 is configured to transmit a second configuration message to the first node to support the first node for the handover, wherein, the first node includes any one of a relay node, a mobile terminal part of the relay node, and a distributed unit of the relay node.

FIG. 23 illustrates an apparatus according to embodiments of the present disclosure.

Referring to the FIG. 23, the apparatus 2300 may include a processor 2310, a transceiver 2320 and a memory 2330. However, all of the illustrated components are not essential. The apparatus 2300 may be implemented by more or less components than those illustrated in FIG. 23. In addition, the processor 2310 and the transceiver 2320 and the memory 2330 may be implemented as a single chip according to another embodiment.

The apparatus 2300 may correspond to the second node described above. For example, the apparatus 2300 may correspond to the second node device illustrated in FIG. 17.

The aforementioned components will now be described in detail.

The processor 2310 may include one or more processors or other processing devices that control the proposed function, process, and/or method. Operation of the apparatus 2300 may be implemented by the processor 2310.

The transceiver 2320 may include a RF transmitter for up-converting and amplifying a transmitted signal, and a RF receiver for down-converting a frequency of a received signal. However, according to another embodiment, the transceiver 2320 may be implemented by more or less components than those illustrated in components.

The transceiver 2320 may be connected to the processor 2310 and transmit and/or receive a signal. The signal may include control information and data. In addition, the transceiver 2320 may receive the signal through a wireless channel and output the signal to the processor 2310. The transceiver 2320 may transmit a signal output from the processor 2310 through the wireless channel.

The memory 2330 may store the control information or the data included in a signal obtained by the apparatus 2300. The memory 2330 may be connected to the processor 2310 and store at least one instruction or a protocol or a parameter for the proposed function, process, and/or method. The memory 2330 may include read-only memory (ROM) and/or random access memory (RAM) and/or hard disk and/or CD-ROM and/or DVD and/or other storage devices.

The embodiments of the present application have at least the following beneficial effects:

during the handover of the relay node when moving, the configuration of the relay node is updated, such as the configuration of the distributed unit part of the first node, the configuration of the mobile terminal part of the first node, and the like, so that the relay node may continuously provide service for a user equipment accessing the first node.

The content that is not described in detail in the fourth node device provided in the embodiment of the present application may refer to the foregoing handover method. The beneficial effects that may be achieved by the fourth node device provided in the embodiment of the present application are the same as that of the foregoing handover method, and are not repeated here.

Those skilled in the art may understand that computer program instructions may be used to implement each block in these structural diagrams and/or block diagrams and/or flow diagrams and a combination of blocks in these structural diagrams and/or block diagrams and/or flow diagrams. Those skilled in the art may understand that these computer program instructions may be provided to a general-purpose computer, a professional computer, or a processor of other programmable data processing methods, so that the solutions defined by one or more blocks in the structural diagrams and/or block diagrams and/or flow diagrams disclosed in the present application may be achieved by the computer or the processor of other programmable data processing methods.

Those skilled in the art may understand that the steps, measures, and solutions in the various operations, methods, processes that have been discussed in the present application may be alternated, modified, combined, or deleted. Further, other steps, measures, and solutions in the various operations, methods, processes that have been discussed in the present application may also be alternated, modified, rearranged, decomposed, combined, or deleted. Further, the prior art that have steps, measures, and solutions in the various operations, methods, processes disclosed in the present application may also be alternated, modified, rearranged, decomposed, combined, or deleted.

The above description is only some implementations of the present application, and it should be noted that those skilled in the art may also make some improvements and modification without departing from the principle of the present application, which should be considered as the scope of protection of the present application.

The invention claimed is:

1. A method performed by an integrated access and backhaul (IAB) donor-central unit (CU) in a wireless communication system, the method comprising:
   transmitting, to a target parent IAB node, a user context configuration request message including backhaul adaptation protocol (BAP) address information for a migrating IAB node;
   receiving, from the target parent IAB node, a user context configuration response message;
   transmitting, to the migrating IAB node via a source parent IAB node, a configuration message including information for a transport network layer (TNL) address that is routable via a target IAB donor-distributed unit (DU),
   wherein the TNL address includes an internet protocol (IP) address; and
   receiving, from the migrating IAB node via the target parent IAB node, a configuration complete message.

2. The method of claim 1, further comprising:

establishing a backhaul channel between the target IAB donor-DU and the target parent IAB node and a backhaul channel between the target parent IAB node and the migrating IAB node.

3. The method of claim 1, wherein the configuration message further includes:

configuration information related to a backhaul channel for the migrating IAB node; and data routing related information for the migrating IAB node.

4. The method of claim 3, wherein the configuration information related to the backhaul channel comprises at least one of:

identification information of the backhaul channel; and indication information on a traffic type carried by the backhaul channel, wherein the indication information on the traffic type comprises F1-C traffic and non-F1 traffic.

5. The method of claim 3, wherein the data routing related information comprises BAP routing identification information including BAP address information of a destination receiving node and path identification information.

6. The method of claim 3, wherein the configuration information related to the backhaul channel, and the data routing related information are used for uplink data transmitted by the migrating IAB node.

7. The method of claim 1, wherein the TNL address corresponds to a type of traffic, and wherein the IP address includes:

a first IP address used for transmitting control signaling; and a second IP address used for transmitting user data.

8. An integrated access and backhaul (IAB) donor-central unit (CU) in a wireless communication system, the IAB donor-CU comprising:

a transceiver; and at least one processor coupled with the transceiver and configured to:

transmit, to a target parent IAB node via the transceiver, a user context configuration request message including backhaul adaptation protocol (BAP) address information for a migrating IAB node;

receive, from the target parent IAB node via the transceiver, a user context configuration response message;

transmit, to the migrating IAB node via a source parent IAB node, a configuration message including information for a transport network layer (TNL) address that is routable via a target IAB donor-distributed unit (DU), via the transceiver, wherein the TNL address includes an internet protocol (IP) address; and receive, from the migrating IAB node via the target parent IAB node, a configuration completion message, via the transceiver.

9. The IAB donor-CU of claim 8, wherein the at least one processor is further configured to:

establish a backhaul channel between the target IAB donor-DU and the target parent IAB node and a backhaul channel between the target parent IAB node and the migrating IAB node.

10. The IAB donor-CU of claim 8, wherein the configuration message further includes:

configuration information related to a backhaul channel for the migrating IAB node; and data routing related information for the migrating IAB node.

11. The IAB donor-CU of claim 10, wherein the configuration information related to the backhaul channel for the migrating IAB node, and the data routing related information for the migrating IAB node are used for uplink data transmitted by the migrating IAB node.

* * * * *